United States Patent
Smith et al.

(10) Patent No.: US 6,803,395 B2
(45) Date of Patent: Oct. 12, 2004

(54) PHOTOPROTECTIVE AND LIGHTFASTNESS-ENHANCING SILOXANES

(75) Inventors: Thomas W. Smith, Penfield, NY (US); Kathleen M. McGrane, Webster, NY (US)

(73) Assignee: Xerox Corporation, Stamford, CT (US)

( * ) Notice: Subject to any disclaimer, the term of this patent is extended or adjusted under 35 U.S.C. 154(b) by 276 days.

(21) Appl. No.: 10/001,741

(22) Filed: Nov. 15, 2001

(65) Prior Publication Data

US 2003/0137570 A1 Jul. 24, 2003

(51) Int. Cl.$^7$ .................. C09D 11/10; C08G 77/14; C08G 77/26; C08G 77/338; C08F 8/30
(52) U.S. Cl. ................ 523/160; 524/860; 524/862; 524/869; 525/326.5; 525/375; 528/33
(58) Field of Search ................ 523/160, 161; 528/31, 32, 33, 40; 525/326.5, 375, 376; 556/450, 462; 524/860, 861, 862, 869

(56) References Cited

U.S. PATENT DOCUMENTS

| | | | |
|---|---|---|---|
| 4,256,493 A | 3/1981 | Yokoyama et al. ........... 106/22 |
| 4,859,759 A * | 8/1989 | Maycock et al. ............. 528/27 |
| 5,051,458 A * | 9/1991 | Costanzi et al. ............. 524/99 |
| 5,089,250 A | 2/1992 | Forestier et al. ............. 424/43 |
| 5,102,707 A * | 4/1992 | Canivenc et al. ............. 428/44 |
| 5,270,426 A * | 12/1993 | Sakuta et al. ................. 528/15 |
| 5,466,768 A * | 11/1995 | Yang ............................. 528/15 |
| 5,610,257 A | 3/1997 | Richard et al. ............... 528/15 |
| 5,643,356 A | 7/1997 | Nohr et al. .............. 106/31.49 |
| 5,686,633 A | 11/1997 | Vieira et al. ................. 549/434 |
| 5,719,204 A | 2/1998 | Beach et al. ................. 523/161 |
| 5,837,792 A * | 11/1998 | Meuwly et al. ................ 528/27 |
| 6,087,416 A * | 7/2000 | Pearlstine et al. .......... 523/160 |
| 6,106,599 A | 8/2000 | Breton et al. ............ 106/31.29 |
| 6,124,376 A | 9/2000 | Nichols et al. ............. 523/160 |
| 6,142,618 A | 11/2000 | Smith et al. .................. 347/85 |
| 6,200,369 B1 | 3/2001 | Schwarz .................. 106/31.43 |
| 6,231,655 B1 * | 5/2001 | Marritt .................... 106/31.58 |
| 6,245,138 B1 * | 6/2001 | Nyssen et al. ........... 106/31.86 |
| 6,270,214 B1 | 8/2001 | Smith et al. ................. 347/101 |
| 6,569,511 B1 * | 5/2003 | Smith et al. ............. 428/195.1 |

FOREIGN PATENT DOCUMENTS

| | | |
|---|---|---|
| EP | 0867486 | 9/1998 |
| EP | 1221381 A2 * | 7/2002 |
| JP | 10007958 | 1/1998 |
| JP | 10007969 | 1/1998 |
| JP | 10-278435 | 10/1998 |
| JP | 11-099740 | 4/1999 |
| JP | 2000-141875 | 5/2000 |
| WO | WO 97/20000 | 6/1997 |

* cited by examiner

Primary Examiner—Callie Shosho
(74) Attorney, Agent, or Firm—Judith L. Byorick

(57) ABSTRACT

Disclosed is an ink composition which comprises water, a colorant, and a lightfastness agent which is a polysiloxane having thereon a hydrophilic moiety and a lightfastness moiety. Also disclosed are printing processes using the ink.

33 Claims, No Drawings

PHOTOPROTECTIVE AND LIGHTFASTNESS-ENHANCING SILOXANES

Copending application U.S. Ser. No. 10/001,572, filed concurrently herewith, entitled "Photoprotective and Lightfastness-Enhancing Siloxanes," with the named inventors Thomas W. Smith and Kathleen M. McGrane, the disclosure of which is totally incorporated herein by reference, discloses a compound of one of the formulae

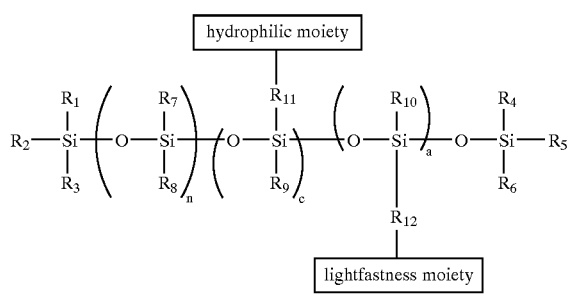

I

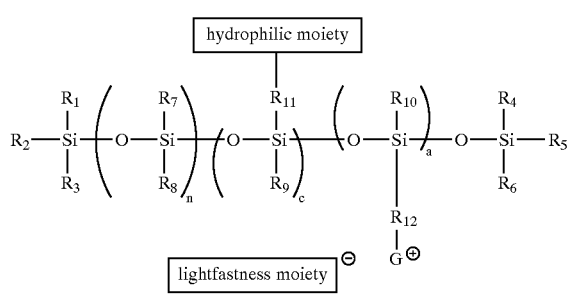

II

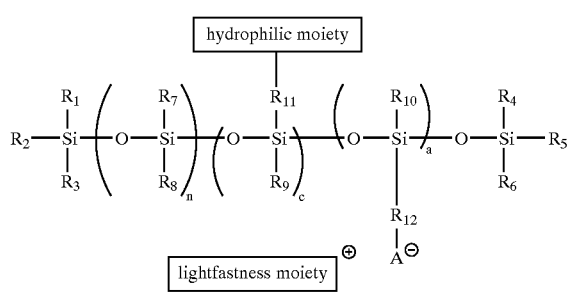

III

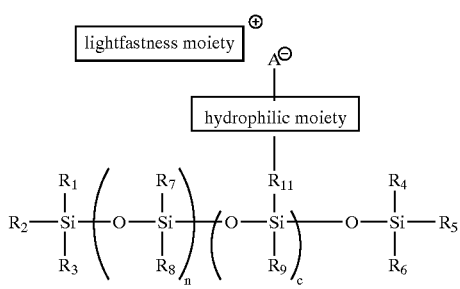

IV

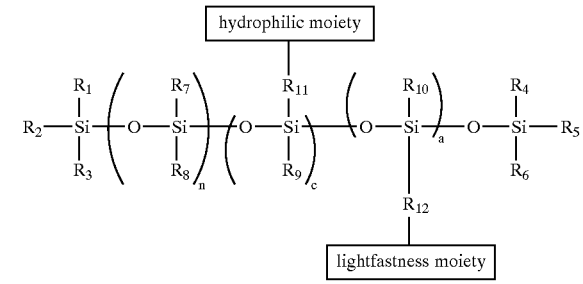

V wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)— monomer units, a is an integer representing the number of repeat —OSi($R_{10}$)($R_{12}$-lightfastness moiety)-monomer units, and c is an integer representing the number of repeat —OSi($R_9$)($R_{11}$-hydrophilic moiety)-monomer units.

Copending application U.S. Ser. No. 10/002,342, now U.S. Pat. No. 6,569,511, filed concurrently herewith, entitled "Recording Sheets with Lightfastness-Enhancing Siloxanes," with the named inventors Thomas W. Smith and Kathleen M. McGrane, the disclosure of which is totally incorporated herein by reference, discloses a recording sheet which comprises a substrate and an image-receiving coating situated on at least one surface of the substrate, said image-receiving coating being suitable for receiving images of an aqueous ink, said image-receiving coating comprising a lightfastness agent which is a polysiloxane having thereon a hydrophilic moiety and a lightfastness moiety.

BACKGROUND OF THE INVENTION

The present invention is directed to aqueous ink compositions, More specifically, the present invention is directed to aqueous ink compositions with improved lightfastness that are particularly suitable for ink jet printing, One embodiment of the present invention is directed to an ink composition which comprises water, a colorant, and a lightfastness agent of one of the formulae

I or

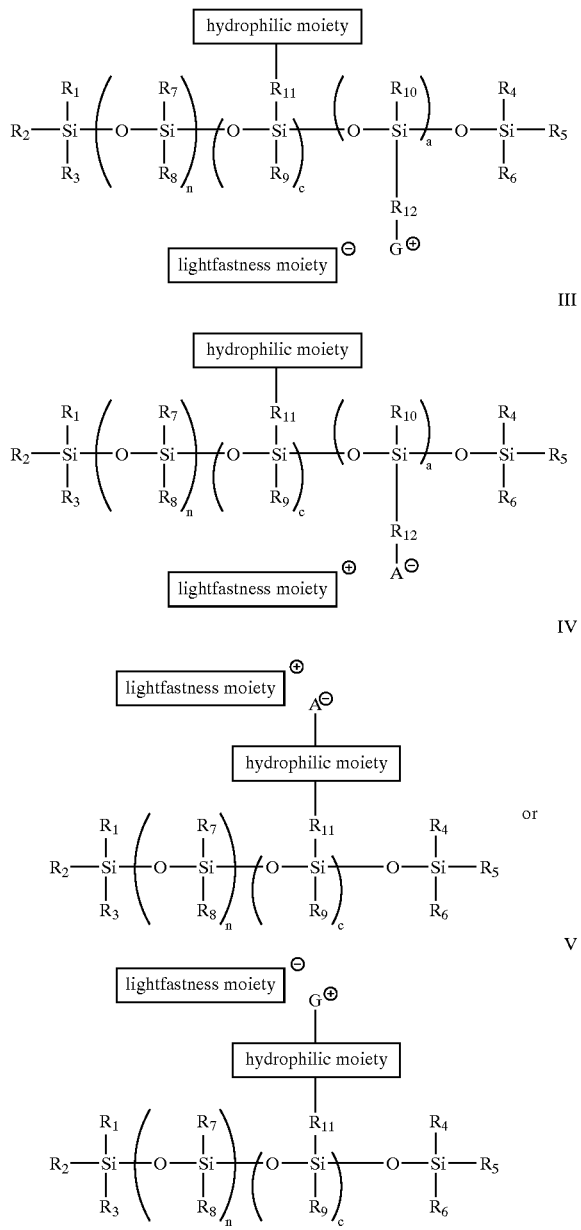

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —$OSi(R_7)(R_8)$— monomer units, a is an integer representing the number of repeat —$OSi(R_{10})(R_{12}$-lightfastness moiety)-monomer units, and c is an integer representing the number of repeat —$OSi(R_9)$ ($R_{11}$-hydrophilic moiety)-monomer units.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 6,270,214 (Smith et al.), the disclosure of which is totally incorporated herein by reference, discloses a process which comprises (a) applying to a substrate a fixing fluid which comprises a material selected from the group consisting of (1) block or graft copolymers of dialkylsiloxanes and polar, hydrophilic monomers capable of interacting with an ink colorant to cause the colorant to become complexed, laked, or mordanted, (2) organopolysiloxane copolymers having functional side groups capable of interacting with an ink colorant to cause the colorant to become complexed, laked, or mordanted, (3) perfluorinated polyalkoxy polymers, (4) perfluoroalkyl surfactants having thereon at least one group capable of interacting with an ink colorant to cause the colorant to become complexed, laked, or mordanted, and (5) mixtures thereof; (b) incorporating into an ink jet printing apparatus an ink composition which comprises water and a colorant which becomes complexed, laked, or mordanted upon contacting the fixing fluid; and (c) causing droplets of the ink composition to be ejected in an imagewise pattern onto the substrate.

U.S. Pat. No. 6,142,618 (Smith et al.), the disclosure of which is totally incorporated herein by reference, discloses a fluid deposition apparatus comprising (a) a fluid supply, (b) a porous fluid distribution member in operative connection with the fluid supply, enabling wetting of the fluid distribution member with a fluid, and (c) a porous metering membrane situated on the fluid distribution member, whereby the metering membrane enables uniform metering of the fluid from the fluid distribution member onto a substrate.

U.S. Pat. No. 6,124,376 (Nichols et al.), the disclosure of which is totally incorporated herein by reference, discloses a process which comprises incorporating into an ink jet printing apparatus an ink composition which comprises water, a colorant, and a polymer of the formula

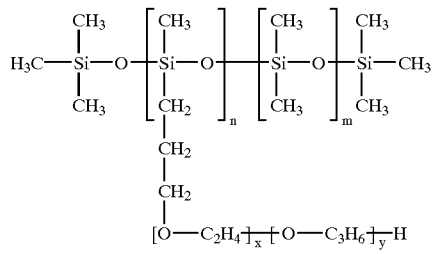

wherein m, n, x, and y are each integers representing the number of repeat monomer units, and wherein the ratio of x:y is from about 10:90 to about 90:10, and causing droplets of the ink to be ejected in an imagewise pattern onto a recording sheet.

U.S. Pat. No. 6,200,369 (Schwarz), the disclosure of which is totally incorporated herein by reference, discloses an ink composition which comprises (a) water, (b) a colorant; and (c) an additive selected from the group consisting of diamido quaternary dialkyl ammonium salts, bitail quaternary tetraalkyl ammonium salts, bitail imidazolium salts, bitail biomimetic phospholipid salts, specific bisquaternary salts, β-hydroxyethyl ethylene diamine fatty acids, specific polyammonium salts, ethoxylated polyamine compounds, biquaternary pyridinium salts, aminofunctional polyorganosiloxanes, and mixtures thereof.

U.S. Pat. No. 6,106,599 (Breton et al.), the disclosure of which is totally incorporated herein by reference, discloses an ink composition comprising (1) an azole compound, (2) a viscosity compound, (3) a lightfastness component, (4) an antioxidant, and (5) a colorant.

U.S. Pat. No. 5,719,204 (Beach et al.), the disclosure of which is totally incorporated herein by reference, discloses polymeric dispersants used in formulating aqueous ink compositions, as well as inks containing those dispersants. The dispersants are graft copolymers comprising a hydrophilic polymeric segment, a hydrophobic polymeric segment incorporating a hydrolytically-stable siloxyl substituent, and a stabilizing segment, such as a reactive surfactant macromer, a protective colloid macromer, or a non-siloxyl hydrophobic monomer. The inks made with these dispersants show excellent stability, print characteristics, waterfastness, light-fastness, optical density, and in-use maintenance characteristics.

U.S. Pat. No. 5,686,633 (Vieira et al.), the disclosure of which is totally incorporated herein by reference, discloses a recording material for ink jet printing comprising a carrier having a surface which can be printed on or a carrier coated on one side with a material which can be printed on, wherein the carrier or the coating contains as a stabilizer at least one compound of the formula

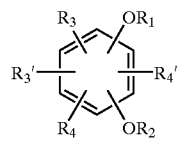

in which $R_1$ and $R_2$ independently of one another are $C_1$–$C_4$ alkyl which is unsubstituted or substituted by one or two —OH, —COO$^-$M$^+$ and/or —SO$_3$$^-$M$^+$ groups, $C_3$–$C_5$ alkenyl, $C_3$–$C_5$ alkynyl, $$—CH_2—CH\underset{O}{\overset{}{\diagdown\diagup}}CH_2—$$

—CH$_2$CH(OH)CH$_2$—SO$_3$$^-$M$^+$, —CO-alkyl($C_1$–$C_4$) which is unsubstituted or substituted by —COOR$^O$ or —CO—N($R_5$)($R_6$) or, if OR$_1$ and OR$_2$ are in the ortho position relative to one another, $R_1$ and $R_2$ together are $C_1$–$C_6$ alkylene, M$^+$ being H$^+$, a monovalent, divalent or trivalent metal cation or a group ($R_{12}$′)N$^+$($R_{12}$″)($R_{13}$′)($R_{14}$′), wherein $R_{12}$′, $R_{12}$″, $R_{13}$ and $R_{14}$ independently of one another are H, $C_1$–$C_4$ alkyl which is unsubstituted or substituted by 1 or 3 OH, $C_1$–$C_4$ alkyl interrupted by 0 allyl, cyclopentyl, cyclohexyl, phenyl, benzyl or tolyl, or $R_1$ is a group

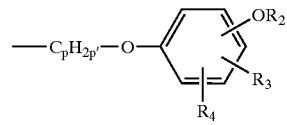

in which p′ is a number from 2 to 6, $R_5$ and $R_6$ independently of one another are H or $C_1$–$C_4$ alkyl which is unsubstituted or substituted by an OH, COOR$^O$, —COO$^-$M$^+$, SO$_3$$^-$M$^+$, P(O)(O$^-$M$^+$)$_2$ or P(O)(OR$^O$)$_2$ group, $R_3$′ and $R_4$′ independently of one another are H, $C_1$–$C_4$ alkyl, OH or $C_1$–$C_4$ alkoxy, $R_3$ and $R_4$ independently of one another are H, halogen, —OR$_7$, —COOR$^O$, —COO$^-$M$^+$, —OOC—$R_5$, —CO—N($R_5$)($R_6$), —($R_5$)N—CO—$R_6$, —CO—$R_5$, —SO$_3$$^-$M$^+$, —SO$_2$N($R_5$)($R_6$), P(OR$_5$)$_3$, —(O)P—(O-M$^+$)$_2$, —(O)P—(OR$^O$)$_2$, $C_1$–$C_8$ alkyl which is unsubstituted or substituted by 1 to 7—OR$_5$ or —OO—C—$R_5$ groups, by 1 or 2 —COOR$^O$, —COO-M$^+$, or —CO—N($R_5$)($R_6$) groups or by one or two —SO$_3$ $^-$M$^+$, —SO$_2$N($R_5$)($R_6$) or —(O)P—(OR$^O$)$_2$ or —(O)P(O-M$^+$)$_2$ groups, where M$^+$, $R_5$ and $R_6$ are as defined above, or $C_5$–$C_6$ cycloalkyl or allyl, R$^O$ being $C_1$–$C_4$ alkyl which is unsubstituted or substituted by an —OH group or —(CH$_2$CH$_2$O)$_r$—H in which r is 1 to 12, and $R_7$ being $C_1$–$C_4$ alkyl or —CO-alkyl($C_1$–$C_4$) each of which is unsubstituted or substituted by 1 or 2 —OH groups or $R_3$ and $R_4$ independently of one another are one of the groups

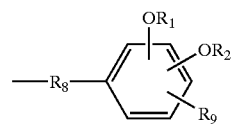

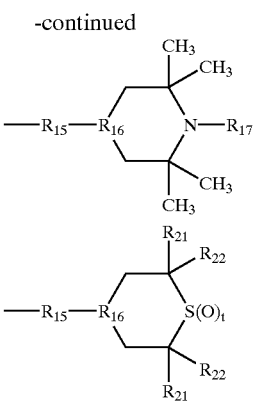

in which $R_8$ is a direct bond or methylene, $R_9$ is H, $C_1$–$C_8$ alkyl, —COO$^-$M$^+$ or —SO$_3$ $^-$M$^+$, where M$^+$, $R_1$ and $R_2$ are as defined above, $R_{15}$ is —CO—, —(O)$_g$C$_p$H$_{2p}$—CO—, —OOC—C$_p$H$_{2p}$—, —COO—C$_p$H$_{2p}$—, —O—CH$_2$CH(OH)—CH$_2$— or

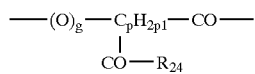

in which g is 0 or 1 and p is 1 to 6 and $R_{24}$ is —OR$_5$, —N(R$_5$)(R$_6$) or a group

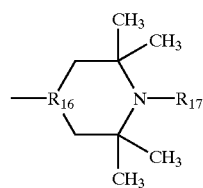

and $R_{16}$ is one of the following radicals:

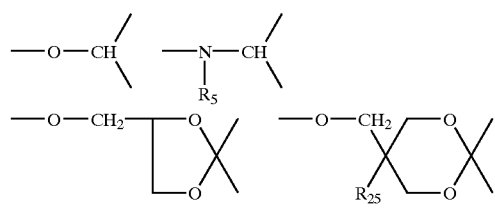

in which $R_{25}$ is H or $C_1$–$C_4$ alkyl, $R_{17}$ is H, $C_1$–$C_4$ alkyl which is unsubstituted or substituted by an —OH group, —CH$_2$—CH(OH)—CH$_2$—OH, $C_1$–$C_4$ alkoxy, —OH, —CO-alkyl($C_1$–$C_4$), —COCH=CH$_2$, allyl, benzyl or a group

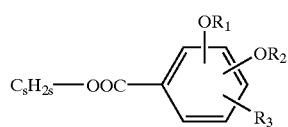

in which s is the number 2 or 3, t is a number from 0 to 2 and $R_{21}$ and $R_{22}$ independently of one another are H, $C_1$–$C_4$ alkyl or phenyl.

U.S. Pat. No. 5,643,356 (Nohr et al.), the disclosure of which is totally incorporated herein by reference, discloses an improved ink suitable for ink jet printing comprising a mixture of a colorant, an arylketoalkene stabilizing compound or a photoreactor, and a liquid vehicle, wherein the colorant is light-stable. When the photoreactor is combined with a wavelength-selective sensitizer to form a radiation transorber, the colorant is mutable upon exposure of the radiation transorber to specific, narrow bandwidth radiation. The colored composition may also contain a molecular includant having a chemical structure which defines at least one cavity wherein each of the colorant and photoreactor or radiation transorber is associated with the molecular includant. The invention also includes ink jet print cartridges containing the improved ink, ink jet printers containing the improved ink and methods of printing using the improved ink.

U.S. Pat. No. 5,610,257 (Richard et al.), the disclosure of which is totally incorporated herein by reference, discloses topically applicable sunscreen/cosmetic compositions well suited for enhanced photoprotection of human skin and/or hair against the damaging effects of UV-A and UV-B irradiation, particularly solar radiation, which comprise a photoprotecting effective amount of a novel benzotriazole-substituted polyorganosiloxane/polyorganosilane having one of the formulae (1) to (3):

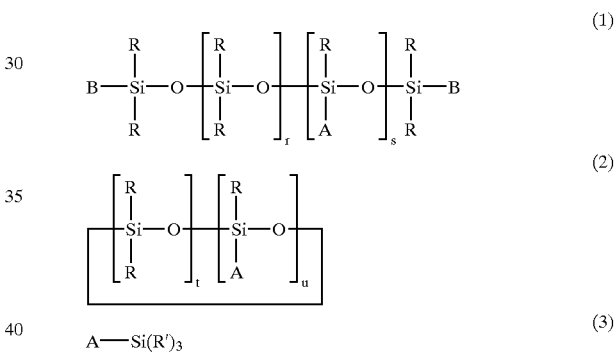

wherein A is a monovalent benzotriazole radical which comprises an acrylate or acrylamide functional group, which is bonded directly to a silicon atom, and which has the formula (4):

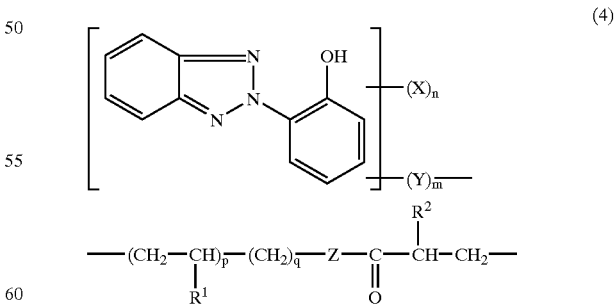

U.S. Pat. No. 5,089,250 (Forestier et al.), the disclosure of which is totally incorporated herein by reference, discloses the cosmetic use, in particular for use as a UV filter, of benzotriazole diorganopolysiloxanes having either formula:

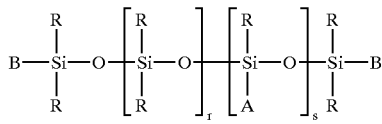

(1)

where R is $C_1$–$C_{10}$ alkyl, phenyl, or 3,3,3-trifluoropropyl, B is R or A, r=0–200, s=0–50, or formulas:

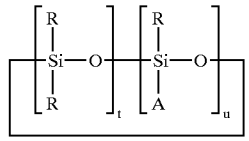

(2)

where u=1–20, t=0–20 and t+u≧3. A and/or B represent a benzotriazole $C_3$–$C_{12}$ alkylene which may be substituted.

U.S. Pat. No. 4,256,493 (Yokoyama et al.), the disclosure of which is totally incorporated herein by reference, discloses a jet ink composition which comprises an aqueous jet ink containing a water-soluble dye, a wetting agent, and water as main components and, incorporated therein, a water-soluble ultraviolet absorbing agent as well as a metal salt, when necessary.

PCT Application WO 97/20000 (Nohr et al.), the disclosure of which is totally incorporated herein by reference, discloses colorant stabilizers and a colorant composition which includes a colorant and a colorant stabilizer. The colorant stabilizer imparts light stability to the colorant so that the colorant does not fade when exposed to electromagnetic radiation such as sunlight or artificial light.

European Patent Application EP 0867486 (Gangal et al.), the disclosure of which is totally incorporated herein by reference, discloses a jet printing ink composition which results in reduced drop misdirection and missing nozzles. The aqueous-based ink composition includes at least one colorant; a wetting agent; and a co-solvent comprising a substituted or unsubstituted lactam, an amide, or mixtures thereof.

Japanese Patent Publication JP 10278435, the disclosure of which is totally incorporated herein by reference, discloses a thermal recording medium having excellent recording traveling properties with excellent light resistance, heat resistance, and chemical resistance of a recorded part and white part. In the thermal recording medium comprising a thermal recording layer containing colorless or pale basic dye, colorant and a protective layer containing an ultraviolet absorbent sequentially provided on a support, the colorant is 1,1-bis(4-hydroxyphenyl)-1-phenylethane and the absorbent is N,N'-bis(2-hydroxy-3-(2H-benzotriazole-2-II)-5-methylbenzyl)-1,4-benzene-dicarboxyamide.

Japanese Patent Publication JP 11099740, the disclosure of which is totally incorporated herein by reference, discloses an ink jet recording sheet having superior light fastness of a recorded image, particularly superior light fastness of a magenta image, and also superior characteristics such as recording density and recording quality, At least one kind of compound like N-2-(3-(benzotriazole-2-yl)-4-hydroxyphenyl propionyl amino)ethyl-N,N,N-trimethyl ammonium chloride and others by a general formula

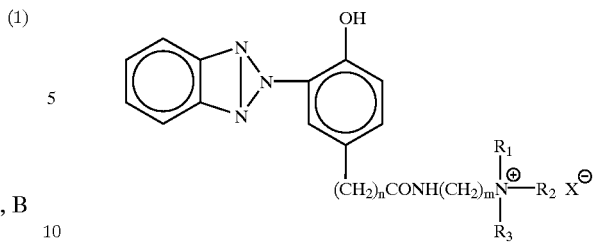

is contained in an ink jet recording sheet for forming a recorded image by using aqueous ink. In the formula, $R_1$, $R_2$, and $R_3$ respectively represent hydrogen atom, $C_1$–$C_4$ alkyl or $C_1$–$C_4$ hydroxyalkyl and X represents organic or inorganic anion. (n) represents 0, 1, or 2 and (m) represents an integer of 2 to 6.

Japanese Patent Publication JP 2000141875, the disclosure of which is totally incorporated herein by reference, discloses a superior ink jet recording sheet of superior light fastness of a recorded image, particularly light fastness of a magenta image and free from the yellowing of surface, the deterioration of the picture quality and the like. A recorded image is formed on an ink jet recording sheet by using an aqueous ink, and in the recording sheet, at least one kind of benzotrizol compound represented by the formula

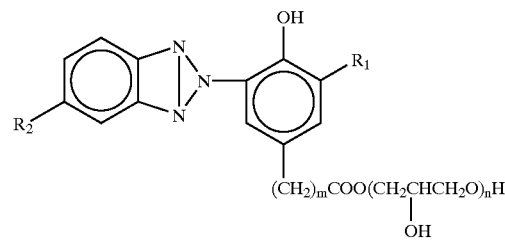

3-(3-(benzotriazol-2-yl)-4-hydroxyphenyl)decaglyceryl propionate or the like is contained in the recording sheet. In the formula, $R_1$ represents a hydrogen atom or a 1–5C alkyl, and $R_2$ represents a hydrogen atom or a chlorine atom. (m) represents 0 or 1–4 integer and (n) represents 1–12 integer.

Japanese Patent Publication JP 10007958, the disclosure of which is totally incorporated herein by reference, discloses an additive for a water based ink which is especially excellent in water resistance and can give a record with a high quality image hardly accompanied by blur of characters or images or border blur at the place where two colors are applied one on top of another. The additive is a polyorganosiloxane-modified amphiphilic polymer which has polyorganosiloxane units and is obtained by copolymerizing a hydrophilic ethylenically unsaturated monomer and a hydrophobic ethylenically unsaturated monomer, or polymerizing an amphiphilic ethylenically unsaturated monomer, in the presence of a polyorganosiloxane having mercaptized organic groups.

Japanese Patent Publication JP 10007969, the disclosure of which is totally incorporated herein by reference, discloses an ink composition excellent in light resistance, water resistance, and water repellency obtained by mixing a compound having a group having the function of stabilizing against ultraviolet rays with a specified amphipathic polymer. The composition is prepared by mixing a polar-solvent-soluble compound having the function of stabilizing against ultraviolet rays (e.g., hydroxyphenylbenzotriazole derivative) with an amphipathic polymer having polyorganosiloxane units, preferably obtained by radical-polymerizing a mixture comprising a hydrophilic ethylenically unsaturated monomer (e.g., acrylamide) and/or an amphipathic ethylenically unsaturated monomer (e.g., methoxypolyethylene glycol monomethacrylate) and optionally a hydrophobic ethylenically unsaturated monomer (e.g., methyl methacrylate) in the presence of an SH-containing polyorganosiloxane.

While known compositions and processes are suitable for their intended purposes, a need remains for lightfastness enhancing agents that can be employed in aqueous ink compositions. In addition, a need remains for lightfastness enhancing agents that can enhance the lightfastness of images on recording substrates, wherein the lightfastness agent is or becomes closely associated with the recording substrate. Further, a need remains for lightfastness enhancing agents that can enhance the lightfastness of images on recording substrates, wherein the lightfastness agent is or becomes closely associated with the colorant in the ink used to generate the images.

SUMMARY OF THE INVENTION

The present invention is directed to an ink composition which comprises water, a colorant, and a lightfastness agent of one of the formulae

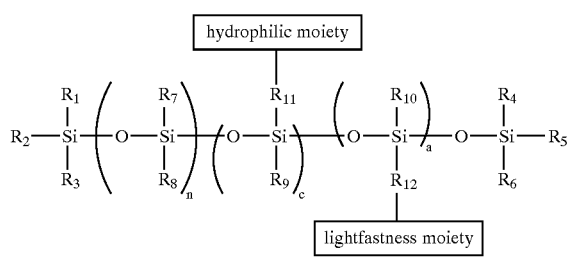

I

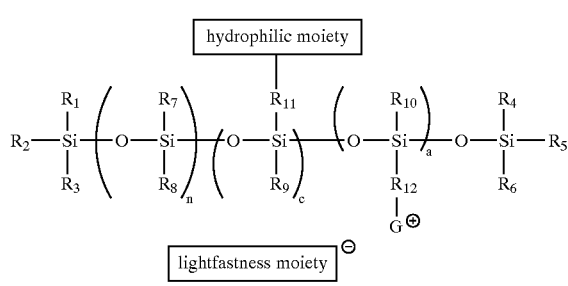

II

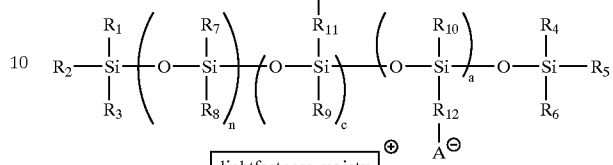

III

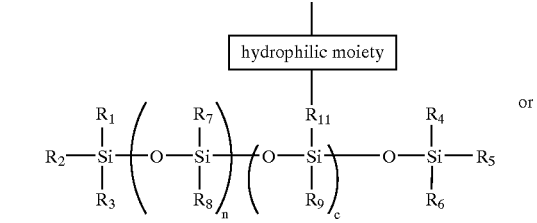

IV or

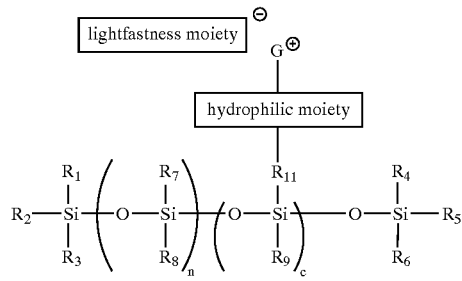

V wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)-monomer units, a is an integer representing the number of repeat —OSi($R_{10}$)($R_{12}$-lightfastness moiety)-monomer units, and c is an integer representing the number of repeat —OSi($R_9$) ($R_{11}$-hydrophilic moiety)-monomer units.

DETAILED DESCRIPTION OF THE INVENTION

The present invention is directed to aqueous ink compositions containing a lightfastness agent of one of the formulae

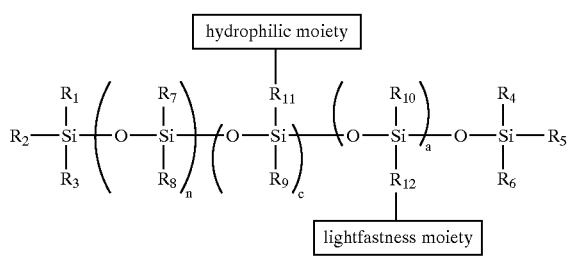

I

-continued

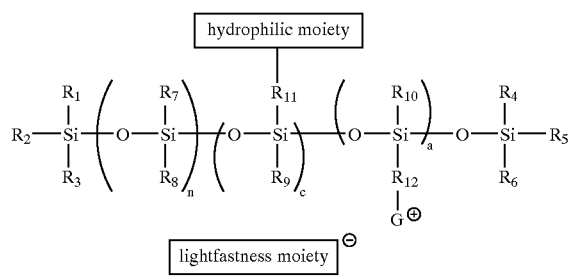

II

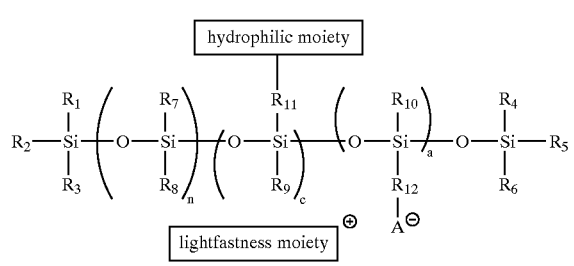

III

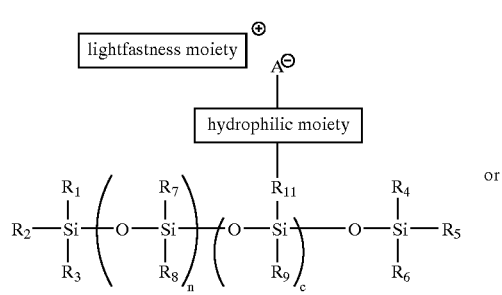

IV

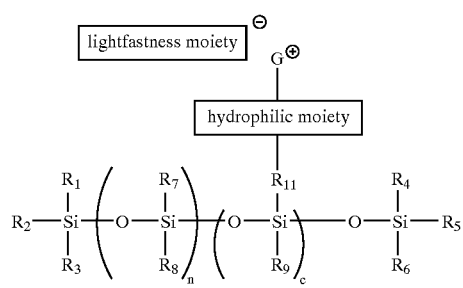

V wherein $R_1$, $R_2$, $R_3$, $R_4$, $R_5$, $R_6$, $R_7$, $R_8$, $R_9$, and $R_{10}$ each, independently of the others, is an alkyl group (including linear, branched, cyclic, saturated, unsaturated, and substituted alkyl groups, and wherein hetero atoms, such as oxygen, sulfur, nitrogen, silicon, phosphorus, and the like can be present in the alkyl group), typically with from 1 to about 22 carbons and preferably with from 1 to about 5 carbon atoms, although the number of carbon atoms can be outside of these ranges, an aryl group (including substituted aryl groups), typically with from 6 to about 12 carbon atoms, with 6 carbon atoms being preferred, although the number of carbon atoms can be outside of this range, an arylalkyl group (including substituted arylalkyl groups), typically with from 7 to about 28 carbon atoms, and preferably with from 7 to about 10 carbon atoms, although the number of carbon atoms can be outside of these ranges, or an alkylaryl group (including substituted alkylaryl groups), typically with from 7 to about 28 carbon atoms, and preferably with from 7 to about 10 carbon atoms, although the number of carbon atoms can be outside of these ranges, $R_{11}$ and $R_{12}$ each, independently of the others, is an alkylene group (including linear, branched, cyclic, saturated, unsaturated, and substituted alkylene groups, and wherein hetero atoms, such as oxygen, sulfur, nitrogen, silicon, phosphorus, and the like can be present in the alkylene group), typically with from 1 to about 22 carbons and preferably with from 1 to about 5 carbon atoms, although the number of carbon atoms can be outside of these ranges, an arylene group (including substituted arylene groups), typically with from 6 to about 12 carbon atoms, with 6 carbon atoms being preferred, although the number of carbon atoms can be outside of this range, an arylalkylene group (including substituted arylalkylene groups), typically with from 7 to about 28 carbon atoms, and preferably with from 7 to about 10 carbon atoms, although the number of carbon atoms can be outside of these ranges, or an alkylarylene group (including substituted alkylarylene groups), typically with from 7 to about 28 carbon atoms, and preferably with from 7 to about 10 carbon atoms, although the number of carbon atoms can be outside of these ranges, G is a cationic moiety capable of forming an ionic bond with an anionic lightfastness moiety, such as those of the formula $-NR_{13}R_{14}R_{15}^+$, wherein $R_{13}$, $R_{14}$, and $R_{15}$ each, independently of the others, is a hydrogen atom, an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, and preferably with from 1 to about 7 carbon atoms, although the number of carbon atoms can be outside of this range, and wherein two or more of $R_{13}$, $R_{14}$, and $R_{15}$ can be joined together to form a ring, or the like, with specific examples of cationic groups $-G^+$ and substituents $-R_{12}G^+$ including (but not being limited to)

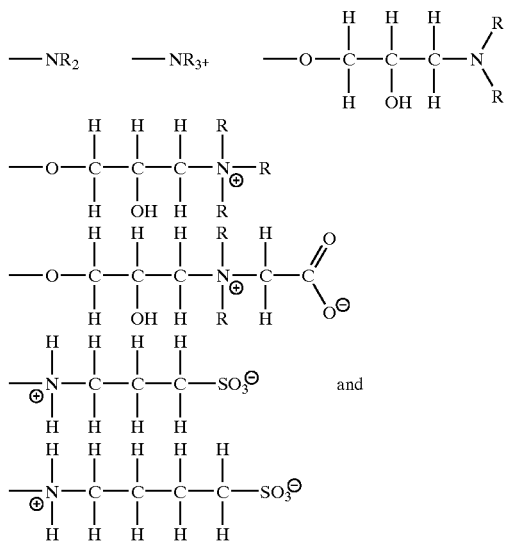

wherein each R, independently of the others, is a hydrogen atom, an alkyl group, including linear, branched, cyclic, substituted, and unsaturated alkyl groups, typically with from 1 to about 22 carbons and preferably with from 1 to about 7 carbon atoms, although the number of carbon atoms can be outside of these ranges, and wherein in a specific embodiment, the R groups are all methyl groups, A is an anionic moiety, such as

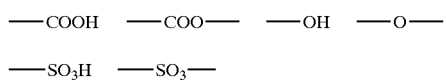

or the like, wherein the substituents on the substituted alkyl, alkylene, aryl, arylene, arylalkyl, arylalkylene, alkylaryl, and alkylarylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, n is an integer representing the number of repeat —OSi($R_7$)($R_8$)-monomer units, typically being from about 3 to about 100, preferably from about 3 to about 50, and more preferably from about 3 to about 20, although the value of n can be outside of these ranges, a is an integer representing the number of repeat —OSi($R_{10}$)($R_{12}$-lightfastness moiety)-monomer units, typically being from 1 to about 20, preferably from 1 to about 10, and more preferably from 1 to about 5, although the value of a can be outside of these ranges, and c is an integer representing the number of repeat —OSi($R_9$)($R_{11}$-hydrophilic segment)-monomer units, typically being from 1 to about 50, preferably from 1 to about 20, and more preferably from 1 to about 10, although the value of c can be outside of these ranges. The number average molecular weight of the polymer typically is from about 1,000 to about 50,000, and preferably from about 2,000 to about 20,000, although the value can be outside of these ranges.

Example of suitable lightfastness moieties include 2-(3-(2H-benzotriazol-2-yl)-4-hydroxyphenyl) groups, of the formulae

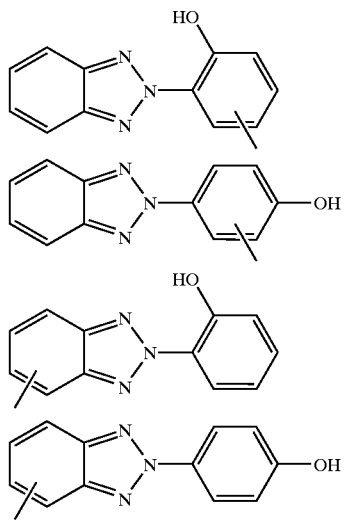

hydroxybenzophenone groups, of the formulae

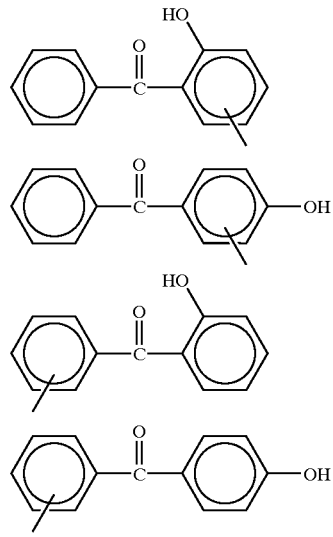

hydroxybenzoic acid groups, of the formula

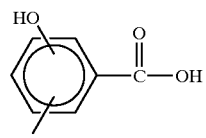

alkoxybenzoic acid groups, of the formula

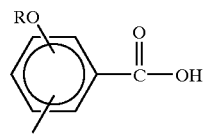

wherein R is an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 24 carbon atoms, preferably with from about 6 to about 12 carbon atoms, and more preferably with from about 6 to about 10 carbon atoms, although the number of carbon atoms can be outside of these ranges, an arylalkyl group (including substituted arylalkyl groups), typically with from about 7 to about 25 carbon atoms, preferably with from about 7 to about 13 carbon atoms, and more preferably with from about 7 to about 11 carbon atoms, although the number of carbon atoms can be outside of these ranges, an alkylaryl group (including substituted alkylaryl groups), typically with from about 7 to about 25 carbon atoms, preferably with from about 7 to about 13 carbon atoms, and more preferably with from about 7 to about 11 carbon atoms, although the number of carbon atoms can be outside of these ranges, wherein the substituents on the substituted alkyl, aryl, arylalkyl, and alkylaryl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, esters of substituted benzoic acids, including those of the formula

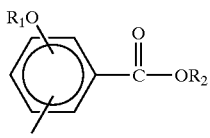

wherein $R_1$ and $R_2$ each, independently of the other, is an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 22 carbon atoms, preferably with from 1 to about 12 carbon atoms, and more preferably with from 1 to about 6 carbon atoms, although the number of carbon atoms can be outside of these ranges, an aryl group (including substituted aryl groups), typically with from about 6 to about 24 carbon atoms, preferably with from about 6 to about 12 carbon atoms, and more preferably with from about 6 to about 10 carbon atoms, although the number of carbon atoms can be outside of these ranges, an arylalkyl group (including substituted arylalkyl groups), typically with from about 7 to about 25 carbon atoms, preferably with from about 7 to about 13 carbon atoms, and more preferably with from about 7 to about 11 carbon atoms, although the number of carbon atoms can be outside of these ranges, an alkylaryl group (including substituted alkylaryl groups), typically with from about 7 to about 25 carbon atoms, preferably with from about 7 to about 13 carbon atoms, and more preferably with from about 7 to about 11 carbon atoms, although the number of carbon atoms can be outside of these ranges, wherein the substituents on the substituted alkyl, aryl, arylalkyl, and alkylaryl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, cyanopropyl groups, allyl groups, mixtures thereof, and the like, wherein two or more substituents can be joined together to form a ring, (hydroxyphenyl)-1,3,5-triazine groups, of the formulae

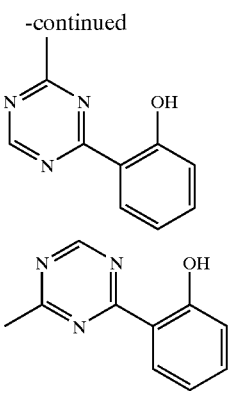

phenylbenzimidazole sulfonic acid groups, of the formulae reducing sugar groups, such as raffinose, those of the formula

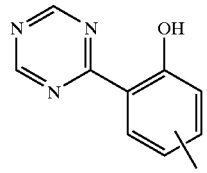

other reducing sugars, and the like.

Examples of suitable anionic lightfastness moieties include (hydroxyphenyl)-benzotriazoles, of the general formulae and hydroxybenzophenones, of the general formulae

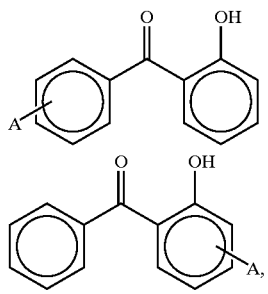

and hydroxybenzoic acids, of the general formulae

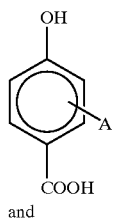

and

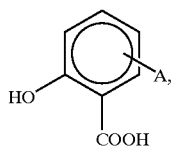

alkoxybenzoic acids, of the general formulae

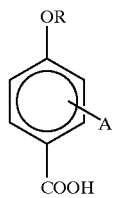 and 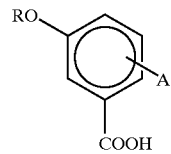 and

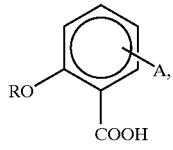

wherein R is an alkyl group, typically with from 1 to about 12 carbon atoms, although the number of carbon atoms can be outside of this range, esters of substituted benzoic acids, of the general formula

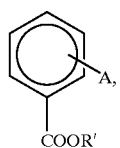

wherein R' is an alkyl group, typically with from 1 to about 12 carbon atoms, although the number of carbon atoms can be outside of this range, (hydroxyphenyl)-1,3,5 triazines, of the general formulae

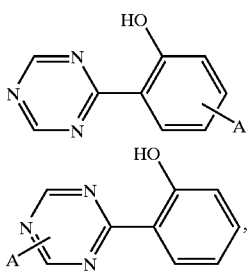

and and the like, wherein in all of the above generic formulae, A is a substituent containing an anionic moiety. A can be either an anionic moiety by itself, such as a carboxylate group, sulfonate group, phosphonate group, or the like, or can be an aliphatic or aromatic group (including aliphatic and aromatic groups containing hetero atoms, such as oxygen, nitrogen, sulfur, silicon, phosphorus, or the like) to which an anionic group is attached. It is to be understood that other substituents can also be present on materials of these formulae. Many compounds in these classes and having ionizable ionic substitutents are commercially available, such as 2-hydroxy-4-methoxybenzophenone-5-sulfonic acid; 2,2'-dihydroxy-4,4'dimethoxybenzophenone-5-sulfonic acid; 2,3-dimethoxybenzoic acid; 3,4-dimethoxybenzoic acid; 3,5-dimethoxybenzoic acid; 2,5-dimethoxybenzoic acid; 2,6-dimethoxybenzoic acid 3,4-dimethoxybenzenesulfonic acid; 3,4,5-trimethoxybenzoic acid; 2,4,5-trimethoxybenzoic acid; 4,5-dimethoxyphthalic acid, 2,3-bis-isopropylidenedioxybenzoic acid; 2,3-bis-(carboxymethyloxy)-benzoic acid; 2,5-dihydroxyphenylacetic acid; and the like, commercially available from sources such as Aldrich Chemical Co., Milwaukee, Wis., and Chem Service Inc., Westchester, Pa. Also suitable are compounds and salts thereof such as those of the following formulae, disclosed in, for example, U.S. Pat. No. 5,686,633, the disclosure of which is totally incorporated herein by reference:

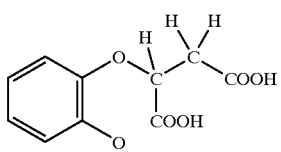

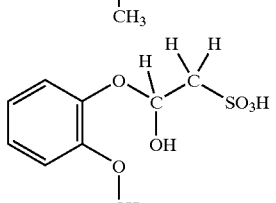

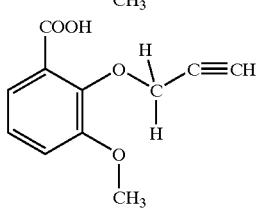

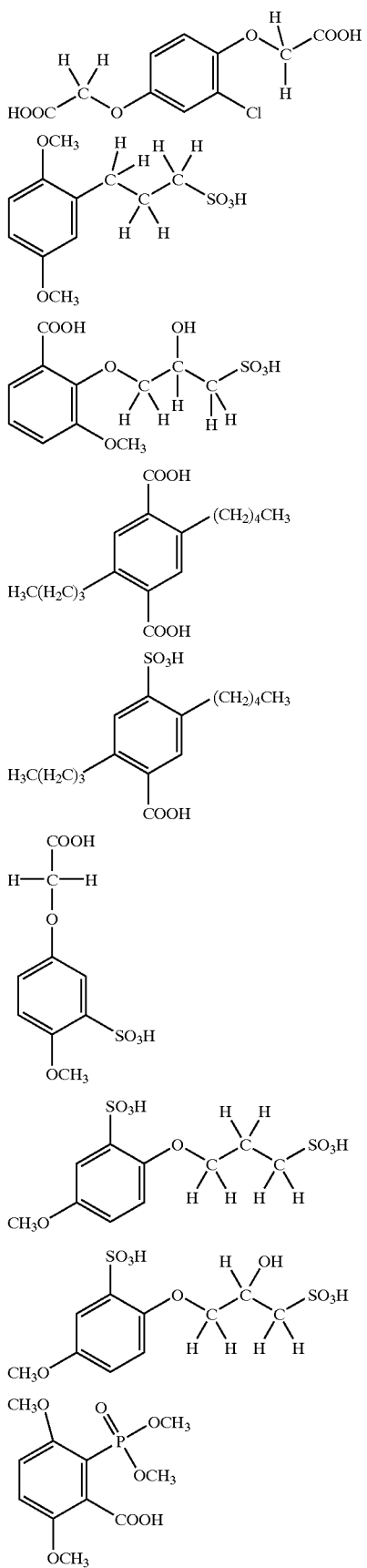
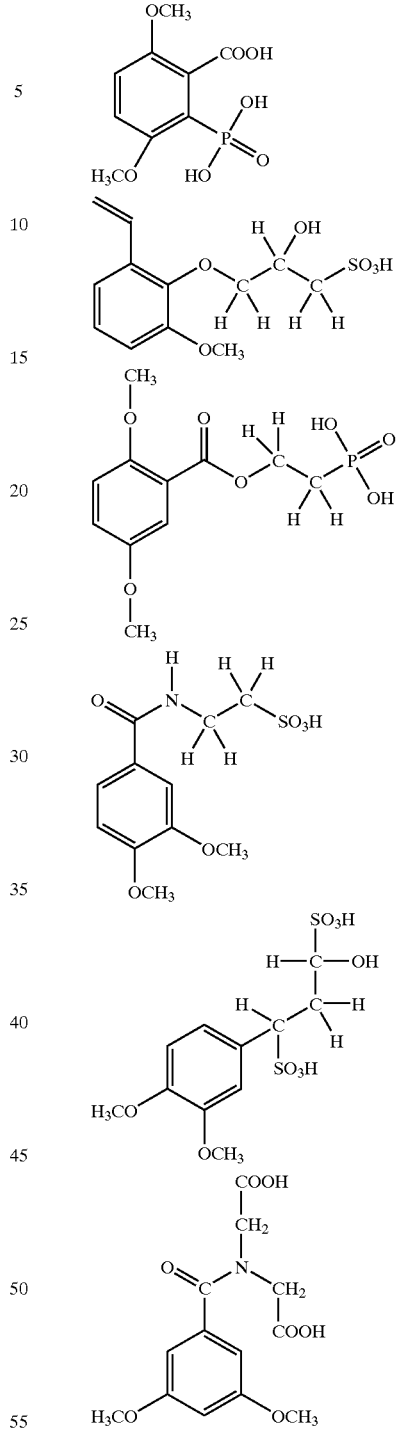
and the like, as well as mixtures thereof. Materials of these formulae can be prepared as disclosed in, for example, U.S. Pat. No. 5,686,633, the disclosure of which is totally incorporated herein by reference.
Examples of suitable cationic lightfastness moieties include (but are not limited to) 2-(3-(2H-benzotriazol-2-yl)-4-hydroxyphenyl) quaternary compounds, of the general formulae

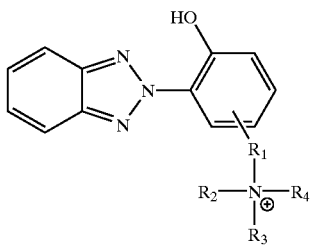

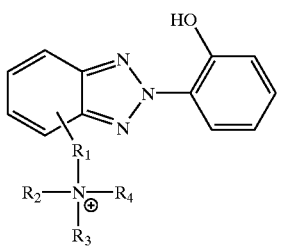

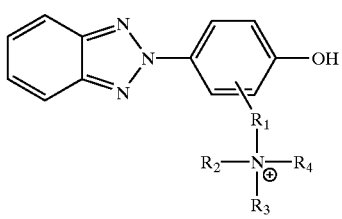

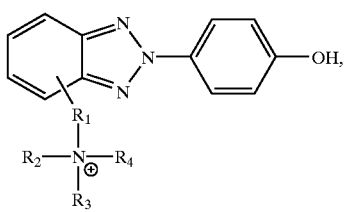

hydroxybenzophenone quaternary compounds, of the general formulae

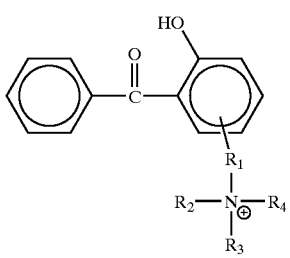

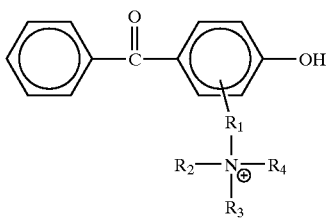

-continued

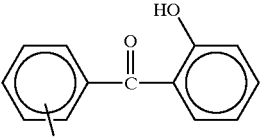

or

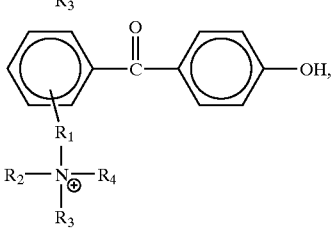

quaternary ammonium derivatives of dialkylaminobenzoates, of the general formula

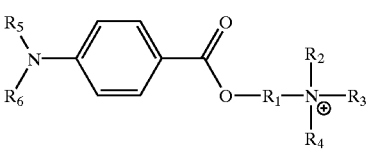

wherein $R_5$ and $R_6$ each, independently of the other, is an alkyl group, typically with from 1 to about 6 carbon atoms, although the number of carbon atoms can be outside of this range, or an arylalkyl group, typically with from about 7 to about 12 carbon atoms, such as a benzyl group, although the number of carbon atoms can be outside of this range, and the like, wherein $R_1$ is an alkylene group (including linear, branched, saturated, cyclic, and substituted alkylene groups, and wherein hetero atoms, such as oxygen, sulfur, nitrogen, silicon, phosphorus, or the like, can be placed between the carbon atoms in the alkylene group), typically with from 1 to about 10 carbon atoms, and preferably with from 1 to about 4 carbon atoms, although the number of carbon atoms can be outside of this range, an arylalkylene group (including substituted arylalkylene groups), typically with from 7 to about 20 carbon atoms, more preferably with from 7 to about 13 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, and $R_2$, $R_3$, and $R_4$ each, independently of the others, is a hydrogen atom, an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 10 carbon atoms, and preferably with from 1 to about 4 carbon atoms, although the number of carbon atoms can be outside of this range, an aryl group (including substituted aryl groups), typically with from 6 to about 18 carbon atoms, more preferably with from 6 to about 12 carbon atoms, although the number of carbon atoms can be outside of this range, an arylalkyl group (including substituted arylalkyl groups), typically with from 7 to about 20 carbon atoms, more preferably with from 7 to about 13 carbon atoms, although the number of carbon atoms can be outside of this range, an alkylaryl group (including substituted alkylaryl groups), typically with from 7 to about 20 carbon atoms, more preferably with from 7 to about 13 carbon atoms, although the number of carbon atoms can be outside of this range, an alkoxy group (including substituted alkoxy groups), typically with from 1 to about 10 carbon atoms, and preferably with from 1 to about 4 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, wherein the substituents on the substituted alkyl, alkylene, aryl, arylene, arylalkyl, arylalkylene, alkylaryl, alkylarylene, alkoxy, alkyleneoxy, and polyalkyleneoxy groups can be (but are not limited to) halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring.

The 2-(3-(2H-benzotriazol-2-yl)-4-hydroxyphenyl) quaternary compounds can be prepared by any desired or suitable method. For example, N-2-(3-(benzotriazole-2-yl)-4-hydroxyphenyl propionyl amino) ethyl-N,N,N-trimethyl ammonium chloride can be made by the synthetic process outlined below:

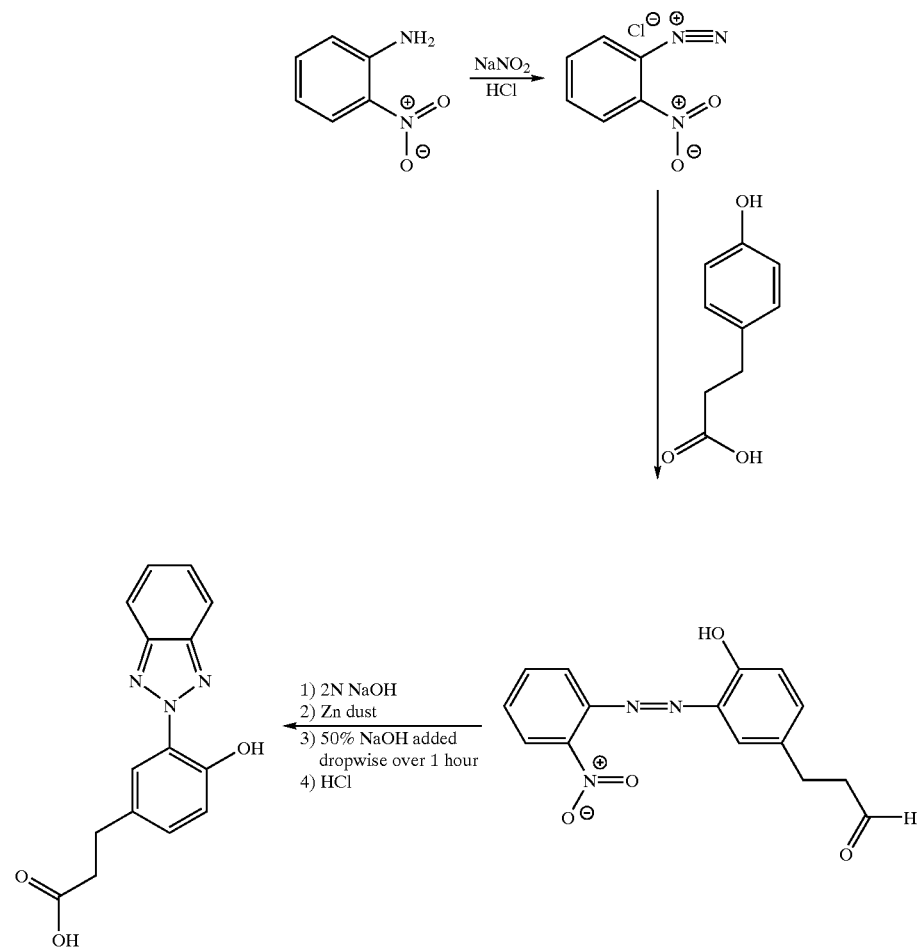

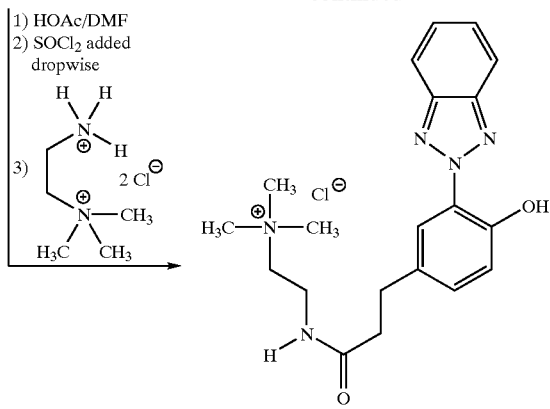

2-Nitroaniline is reacted with sodium nitrite in hydrochloric acid to yield the diazonium salt. The diazonium salt is reacted stoichiometrically with 2-(4-hydroxyphenyl) propionic acid to yield the corresponding azo compound. Dissolution in 2N NaOH and addition of Zn dust, followed by dropwise addition of 50 percent NaOH over a period of about one hour to a reaction mixture held at 450° C. yields the desired 2-hydroxyphenybenzotriazole. 2-(3-(2H-benzotriazol-2-yl)-4-hydroxyphenyl)propionic acid is isolated by acidification with hydrochloric acid and isolation of the crystalline precipitated product is by filtration. 2-(3-(2H-benzotriazol-2-yl)-4-hydroxyphenyl)propionyl aminoethyl-trimethylammonium chloride is obtained by stoichiometric reaction of a solution of 2-(3-(2H-benzotriazol-2-yl)-4-hydroxyphenyl)propionic acid in a mixture of acetic acid and dimethylformamide, with thionyl chloride, added dropwise, to generate 2-(3-(2H-benzotriazol-2-yl)-4-hydroxyphenyl)propionyl chloride. The acid chloride is reacted in situ with 2-aminoethyl(trimethylammonium chloride hydrochloride to yield 2-(3-(2H-benzotriazol-2-yl)-4-hydroxyphenyl)propionyl aminoethyl-trimethylammonium chloride, which is isolated by dilution with water and filtration. In all of the reactions in this sequence the reaction mixture is cooled in a water bath to hold the reaction temperature at about 250° C.

The quaternary dimethylaminobenzoic acid derivative

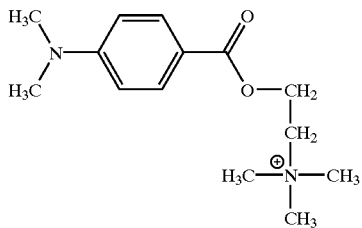

can be synthesized by the reaction of dimethylaminobenzoic acid with choline chloride in the presence of thionyl chloride.

The hydrophilic moiety can be a separate substituent, as in Formulae I, II, and III, or integral to (having) an anionic substituent the counterion of which is a cationic lightfastness moiety, as in Formula IV, or integral to (having) a cationic substituent the counterion of which is an anionic lightfastness moiety, as in Formula V. Examples of suitable hydrophilic moieties include polyoxyalkylene chains, such as polyethylene oxide, polypropylene oxide, polybutylene oxide, random or block copolymers of two or more oxyalkylene monomers, or the like, such as those of the general formulae

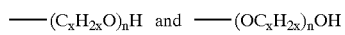

wherein x, independently in each single repeat alkylene oxide unit, is an integer of 2, 3, or 4 and n is an integer representing the number of repeat alkylene oxide units, and is typically from 1 to about 60, preferably from 1 to about 30, and more preferably from 1 to about 10, although the value of n can be outside of these ranges, poly(2-alkyloxazoline)s, such as those of the general formula

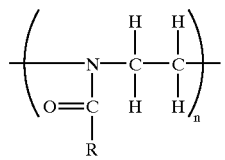

wherein R is an alkyl group, including linear, branched, cyclic, and unsaturated alkyl groups, typically with from 1 to about 22 carbons and preferably with from 1 to about 6 carbon atoms, although the number of carbon atoms can be outside of these ranges, an aryl group, typically with from 6 to about 12 carbon atoms, with 6 carbon atoms being preferred, although the number of carbon atoms can be outside of this range, an arylalkyl group, typically with from 7 to about 28 carbon atoms, and preferably with from 7 to about 10 carbon atoms, although the number of carbon atoms can be outside of these ranges, or an alkylaryl group, typically with from 7 to about 28 carbon atoms, and preferably with from 7 to about 10 carbon atoms, although the number of carbon atoms can be outside of these ranges, and n is an integer representing the number of repeat monomer units, and is typically from 1 to about 100, preferably from 1 to about 50, and more preferably from 1 to about 30, although the value of n can be outside of these ranges, poly(ethyleneimine) chains, including those of the general formula

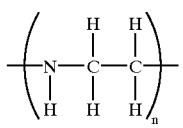

wherein n is an integer representing the number of repeat monomer units, and is typically from 1 to about 100, preferably from 1 to about 50, and more preferably from 1 to about 30, although the value of n can be outside of these ranges, or the like.

Commercially available materials include those of the general formula

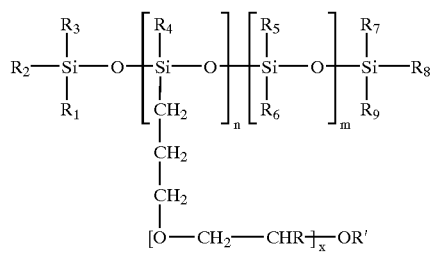

wherein R and R' each, independently of the other, is hydrogen or methyl, and $R_1$, $R_2$, $R_3$, $R_4$, $R_5$, $R_6$, $R_7$, $R_8$, and $R_9$ each, independently of the others, is an alkyl group, including linear, branched, cyclic, and unsaturated alkyl groups, typically with from 1 to about 22 carbons and preferably with from 1 to about 5 carbon atoms, although the number of carbon atoms can be outside of these ranges, an aryl group, typically with from 6 to about 12 carbon atoms, with 6 carbon atoms being preferred, although the number of carbon atoms can be outside of this range, or an arylalkyl group (with either the alkyl or the aryl portion of the group being attached to the silicon atom), typically with from 7 to about 28 carbon atoms, and preferably with from 7 to about 10 carbon atoms, although the number of carbon atoms can be outside of these ranges, and wherein the alkyl, aryl, or arylalkyl groups can, if desired, be substituted with substituents that do not significantly impair the ability of the polymer to form a uniform monolayer on a paper surface, such as cyanopropyl groups, halide groups, or the like, although substituents are not preferred, and m, n, and x are each integers representing the number of repeat monomer units, x typically being an integer of from about 6 to about 30, and preferably from about 9 to about 20, although the value can be outside of these ranges. The relative molar ratio of n and m typically falls within the range of from about 3:97 to about 60:40, although the relative ratio can be outside of this range. Molecular weights of preferred materials typically are from about 600 to about 30,000 grams per mole, although the molecular weight can be outside of this range. Commercially available examples of this class of materials are the TEGOPREN®s, available from Goldschmidt Chemical, Hopewell, Va., such as TEGOPREN® 5842, wherein x is 16 and the mole ratio of n to m is about 22:78; the DBE series of hydrophilic silicones available form Gelest, Inc., Tullytown, Pa.; the SILWET® silicone surfactant series available from Witco Corporation, OrganoSilicones Group, Greenwich, Conn.; Silicone Polyol copolymers available from Genesee Polymers Corporation, Flint, Mich.; and the like. Siloxane-oxyethylene block and graft copolymers typically are prepared by hydrosilylation of monoallyl or monovinyl ethers of polyethylene oxide glycols under the catalytic action of chloroplatinic acid by (Si—H) groups in dimethylsiloxane/methylhydrosiloxane copolymers, as disclosed in, for example, U.S. Pat. No. 2,486,458, the disclosure of which is totally incorporated herein by reference. The controlled synthesis of AB, ABA, and $(AB)_n$ type polyethylene oxide (A) and polydialkylsiloxane (B) copolymers by hydrosilylation of mono- or diallyl-terminated polyethylene oxide oligomers and telechelic (Si—H) terminated polydialkylsiloxane oligomers is also disclosed by, for example, Haessllin, *Makromol. Chem.*, 186, p. 357 (1985), the disclosure of which is totally incorporated herein by reference. Further information regarding the synthesis of such block and graft copolymers is also disclosed in, for example, U.S. Pat. No. 2,846,548; British Patent 983,850; British Patent 955,916; B. Kanner, B. Prokai, C. S. Eschbach, and G. J. Murphy, *J. Cellular Plast.*, November/December 315 (1979); H. W. Haesslin, H. F. Eicke and G. Riess, *Makromol. Chem.*, 185, 2625 (1984); M. Galin, A. Mathis, *Macromolecules*, 14, 677 (1981); and I. Yilgör and J. E. McGrath, "Polysiloxane-Containing Copolymers: A survey of Recent Developments," *Advances in Polymer Science*, Volume 86, pp. 1–86 (Springer-Verlag 1988), the disclosures of each of which are totally incorporated herein by reference.

Commercially available materials also include those of the general formula

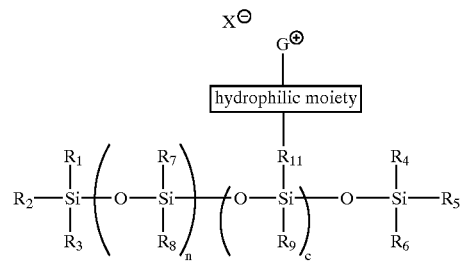

wherein $R_1$, $R_2$, $R_3$, $R_4$, $R_5$, $R_6$, $R_7$, $R_8$, and $R_9$ each, independently of the others, is an alkyl group, including linear, branched, cyclic, and unsaturated alkyl groups, typically with from 1 to about 22 carbons and preferably with from 1 to about 5 carbon atoms, although the number of carbon atoms can be outside of these ranges, an aryl group, typically with from 6 to about 12 carbon atoms, with 6 carbon atoms being preferred, although the number of carbon atoms can be outside of this range, or an arylalkyl group (with either the alkyl or the aryl portion of the group being attached to the silicon atom), typically with from 7 to about 28 carbon atoms, and preferably with from 7 to about 10 carbon atoms, although the number of carbon atoms can be outside of these ranges, and wherein the alkyl, aryl, or arylalkyl groups can, if desired, be substituted with substituents such as cyanopropyl groups, halide groups, or the like, although substituents are not preferred, $R_{11}$ is a spacer group which is either an alkylene group, typically with from 2 to about 12 carbon atoms, and preferably with from 2 to about 6 carbon atoms, or an arylalkylene group wherein the alkyl portion is attached to the silicon atom and the aryl portion is attached to the G group, with the alkyl portion of the arylalkylene group typically having from 2 to about 12 carbon atoms, and preferably having from 2 to about 6 carbon atoms, and with the aryl portion of the arylalkylene group typically having 6 carbon atoms, n and c are each integers representing the number of repeat monomer units, G is a cationic functional group capable of binding anionic lightfastness agents as defined hereinabove, and X is an anion, including (but not limited to) halides, such as chloride, bromide, and iodide, nitrate, sulfate, sulfite, or the like. In a preferred embodiment, the R groups are all methyl groups. These polymers can be block copolymers, random copolymers, or alternating copolymers, Typically, the "n" monomers are present in the polymer in an amount of from 0 to about 99 mole percent, and preferably from about 50 to about 95 mole percent, and the "c" monomers are typically present in the polymer in an amount of from about 1 to 100 mole percent, and preferably from about 5 to about 50 mole percent, although the relative ratio of monomers can be outside of these ranges. The number average molecular weight of these polymers typically is from about 500 to about 30,000, and preferably from about 1,000 to about 5,000, although the value can be outside of these ranges. One specific example of a member of this class of organopolysiloxane copolymers is that of quaternary amino functionalized siloxane polymers, including those of the general formula

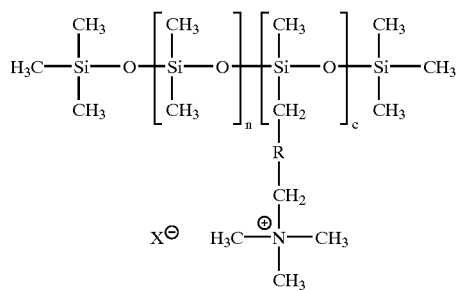

wherein n and c are each integers representing the number of repeat monomer units, X is an anion, and R is a methylene group or a benzyl group. A commercially available example of this class of materials is QMS-435, a hydrophilic silicone supplied by Gelest, Inc., Tullytown, Pa.

Polysiloxanes of the present invention can be prepared by any desired or effective method. For example, a commercially available polymer or oligomer of the general formula

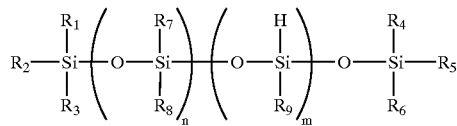

can be reacted with a lightfastness compound having a terminal >C=C< group and an alkoxy or polyalkyleneoxy compound having a terminal >C=C< group in the presence of a platinum catalyst. Siloxane-oxyethylene block and graft copolymers typically are prepared by hydrosilylation of monoallyl or monovinyl ethers of polyethylene oxide glycols under the catalytic action of chloroplatinic acid by (Si—H) groups in dimethylsiloxane/methylhydrosiloxane copolymers, as disclosed in, for example, U.S. Pat. No. 2,486,458, the disclosure of which is totally incorporated herein by reference. The controlled synthesis of AB, ABA, and $(AB)_n$ type polyethylene oxide (A) and polydialkylsiloxane (B) copolymers by hydrosilylation of mono- or diallyl-terminated polyethylene oxide oligomers and telechelic (Si—H) terminated polydialkylsiloxane oligomers is also disclosed by, for example, Haesslin, *Makromol. Chem.*, 186, p. 357 (1985), the disclosure of which is totally incorporated herein by reference. Further information regarding the synthesis of such block and graft copolymers is also disclosed in, for example, U.S. Pat. No. 2,846,548; British Patent 983,850; British Patent 955,916, B. Kanner, B. Prokai, C. S. Eschbach, and G. J. Murphy, *J. Cellular Plast.*, November/December 315 (1979); H. W. Haesslin, H. F. Eicke and G. Riess, *Makromol, Chem.*, 185, 2625 (1984); M. Galin, A. Mathis, *Macromolecules*, 14, 677 (1981); and 1. Yilgor and J. E. McGrath, "Polysiloxane-Containing Copolymers: A survey of Recent Developments," *Advances in Polymer Science*, Volume 86, pp. 1–86 (Springer-Verlag 1988), the disclosures of each of which are totally incorporated herein by reference. Siloxane-oxyethylene block and graft copolymers with covalently bound lightfastness substituents can be prepared by hydrosilylation of vinyl or allyl derivatives of lightfastness moieties prior to or simultaneously with the hydrosilylation of monoallyl or monovinyl ethers of polyethylene oxide glycols under the catalytic action of chloroplatinic acid by (Si—H) groups in dimethylsiloxane/methylhydrosiloxane copolymers.

An illustrative example of such a reaction is as follows:

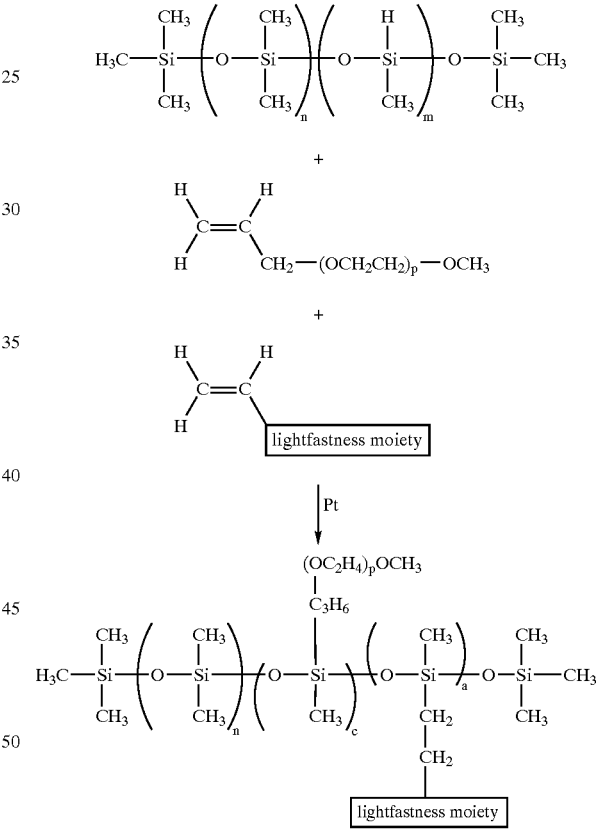

wherein m = a + c and is, for example,

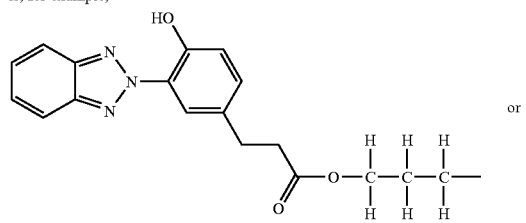

or

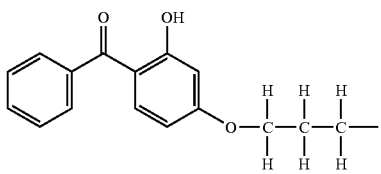

4-alloxy-2-hydroxy benzophenone is commercially available (Aldrich 41,583-9) as are 2-(3-2H-benzotriazol-2-yl)-4-hydroxyphenyl)ethyl methacrylate (Aldrich 41,343-7) eugenol (Aldrich E5,179-1), 4-allyl-1,2-dimethoxybenzene (Aldrich 28,442-4), and 4-allyl-2,6-dimethoxyphenol (Aldrich A3160-1). 2-(3-2H-benzotriazol-2-yl)-4-hydroxyphenyl)ethylpentenoate can be synthesized by esterification of 2-(3-2H-benzotriazol-2-yl)-4-hydroxyphenethyl alcohol (Aldrich 43,071-4) with pentenoic acid (Aldrich 24,592-5) or pentenoic anhydride (Aldrich 47,180-1).

In addition, a commercially available polymer or oligomer of the general formula

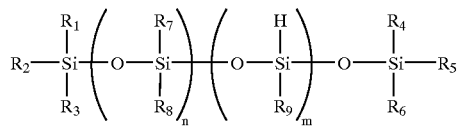

can be reacted with an anionic compound having a terminal >C=C< group and an alkoxy or polyalkyleneoxy compound having a terminal >C=C< group in the presence of a platinum catalyst. An illustrative example of such a reaction is as follows:

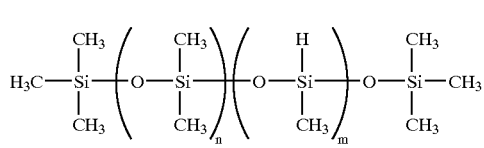

+

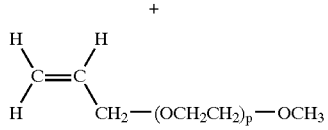

+

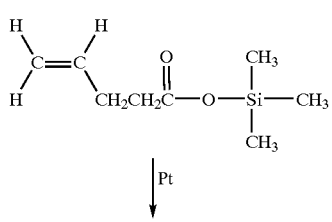

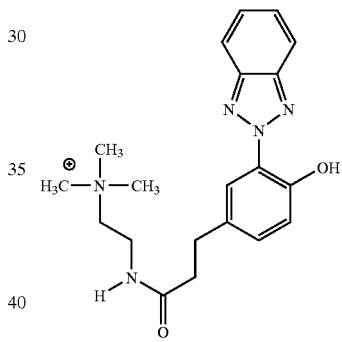

wherein m = a + c and lightfastness moiety ⊕ is, for example,

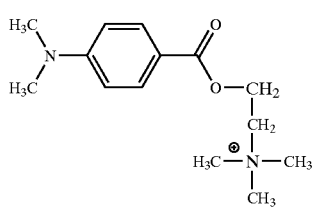

or

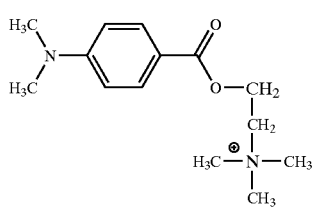

In aqueous solutions with a pH greater than about 5, the trimethylsilyl ester group is ionized to carboxylate, —COO⁻. Introduction of a lightfastness moiety bearing a cationic substituent results in ion exchange to associate the lightfastness moiety with a anionic group covalently attached to the backbone of the hydrophilic siloxane, illustrated as follows:

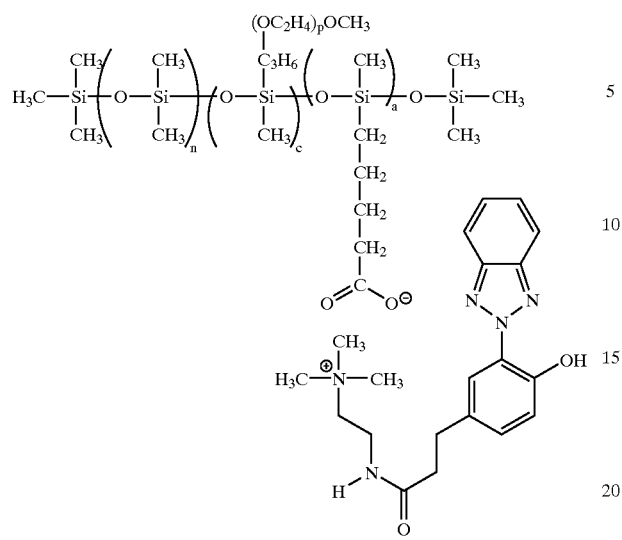
The quaternary ammonium substituted hydroxyphenyl benzotriazole illustrated above can be synthesized by the synthetic process outlined below:
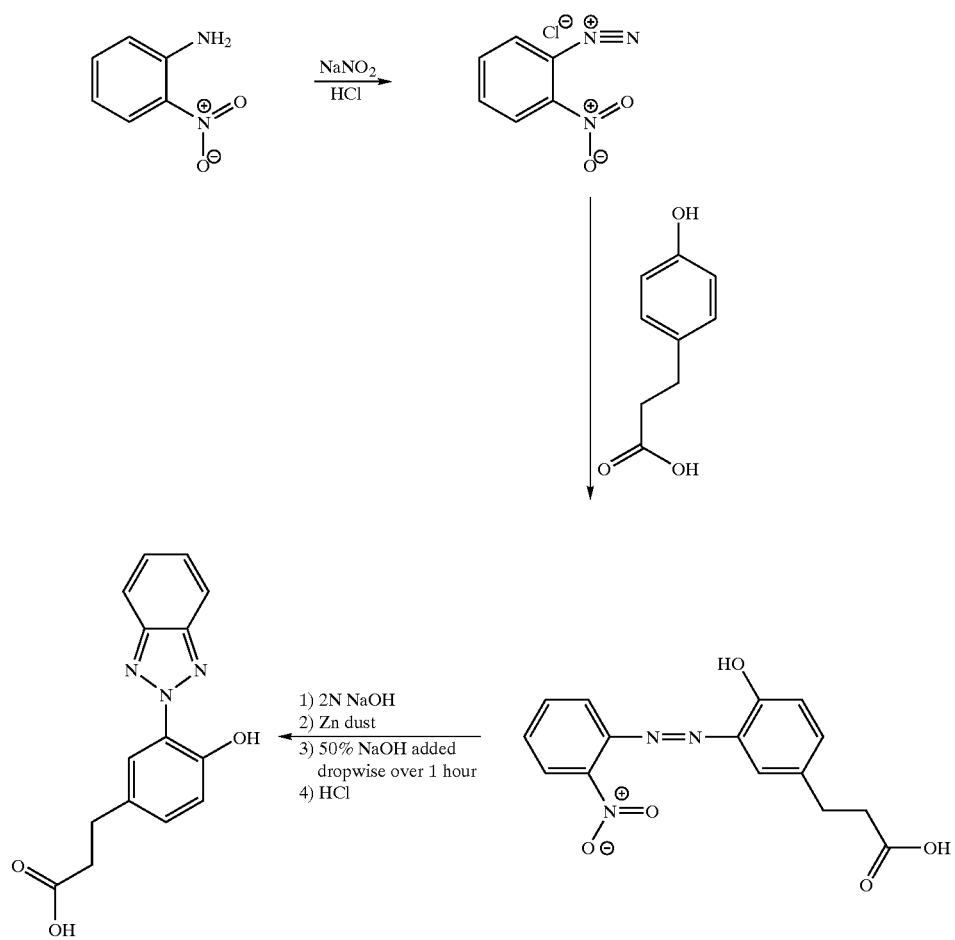

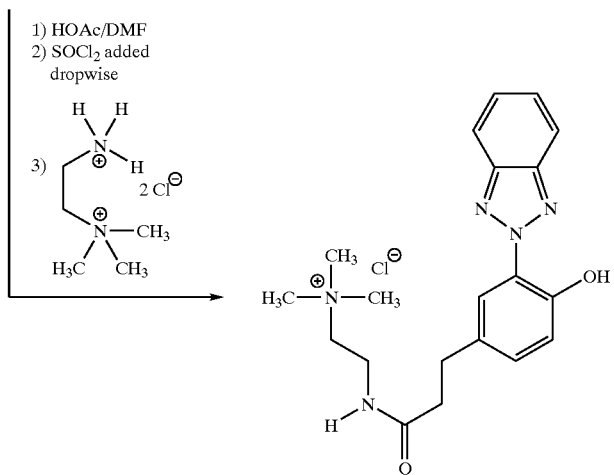

2-Nitroaniline is reacted with sodium nitrite in hydrochloric acid to yield the diazonium salt. The diazonium salt is reacted stoichiometrically with 2-(4-hydroxyphenyl) propionic acid to yield the corresponding azo compound. Dissolution in 2N NaOH and addition of Zn dust, followed by dropwise additon of 50 percent NaOH over a period of about one hour to a reaction mixture held at 45° C. yields the desired 2-hydroxyphenybenzotriazole. 2-(3-(2H-benzotriazol-2-yl)-4-hydroxyphenyl)propionic acid is isolated by acidification with hydrochloric acid and isolation of the crystalline precipitated product is by filtration. 2-(3-(2H-benzotriazol-2-yl)-4-hydroxyphenyl)propionyl aminoethyl-trimethylammonium chloride is obtained by stoichiometric reaction of a solution of 2-(3-(2H-benzotriazol-2-yl)-4-hydroxyphenyl)propionic acid in a mixture of acetic acid and dimethylformamide, with thionyl chloride, added dropwise, to generate 2-(3-(2H-benzotriazol-2-yl)-4-hydroxyphenyl)propionyl chloride. The acid chloride is reacted in situ with 2-aminoethyl(trimethylammonium chloride hydrochloride to yield 2-(3-(2H-benzotriazol-2-yl)-4-hydroxyphenyl)propionyl aminoethyl-trimethylammonium chloride, which is isolated by dilution with water and filtration. In all of the reactions in this sequence the retain mixture is cooled in a water bath to hold the reaction temperature at about 25° C.

The quaternary dimethylaminobenzoic acid derivative can be synthesized by the reaction of dimethylaminobenzoic acid with choline chloride in the presence of thionyl chloride.

Further, commercially available cationic substituted polysiloxone oligomers or polymers can be subjected to an ionic exchange process to associate the cationic groups thereon with a lightfastness compound substituted with an anionic moiety. The ion exchange can be performed by simple mixing of a solution containing the anionic lightfastness agent in a solvent such as acetone with a solution containing the cationic polysiloxane in a solvent such as acetone. An illustrative example of such a reaction is as follows:

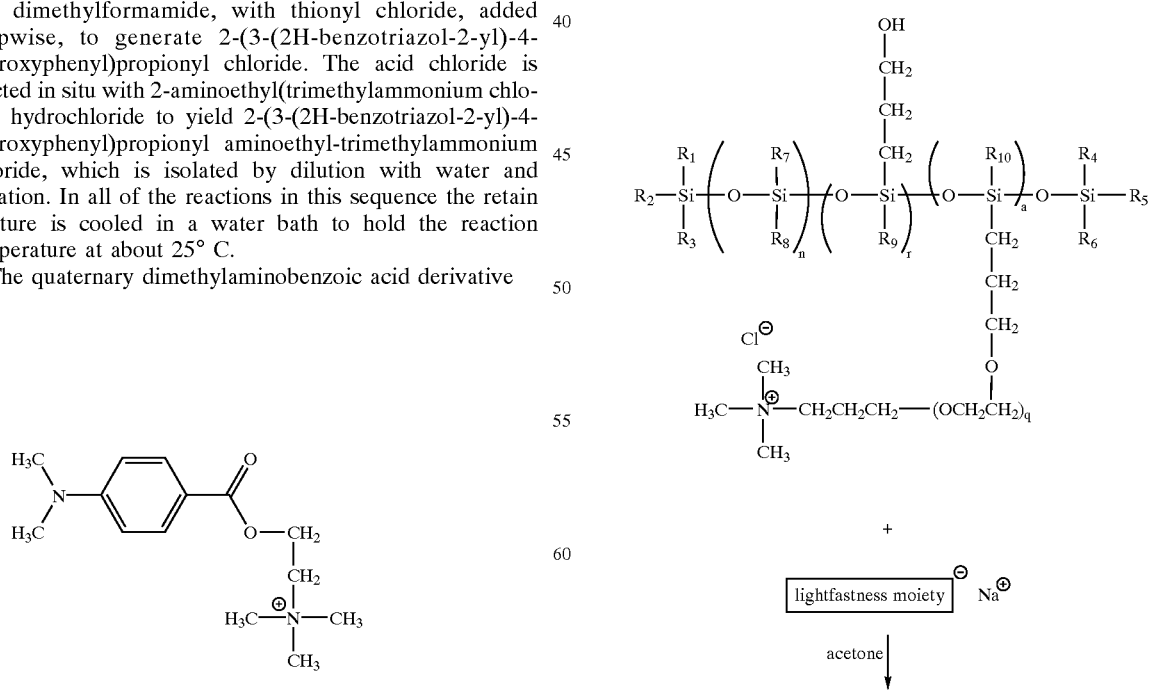

-continued

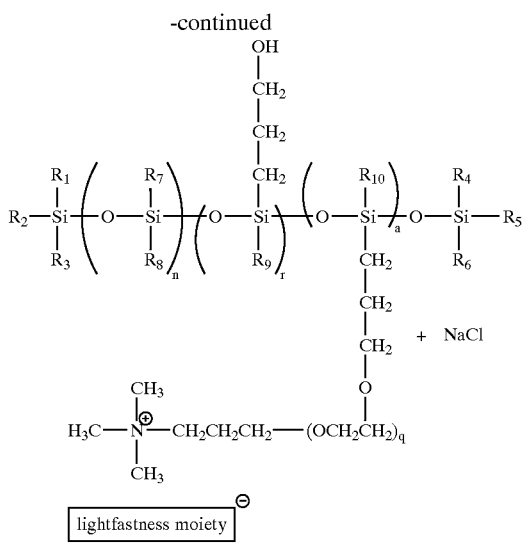

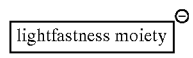

wherein r is an integer representing the number of repeat —OSi(R$_9$)(C$_3$H$_5$OH)-monomer units, typically from about 3 to about 30, and preferably from about 3 to about 10although the value of r can be outside of these ranges, q is an integer representing the number of repeat —OCH$_2$CH$_2$-monomer units, typically from about 6 to about 30, and preferably from about 6 to about 10, although the value of q can be outside of these ranges, and -continued
is, for example,

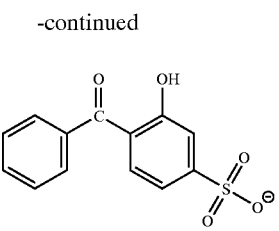

is, for example,

Sulfonate substituted lightfastness moieties can be obtained from a variety of commercial sources, such as Chem Service Inc., Westchester, Pa., and Lancaster Synthesis Inc., Windham, N.J. Polymeric and oligomeric siloxanes having quaternary ammonium substituents thereon are commercially available as, for example, TEGOPREN® 6922 and TEGOPREN® 6920, obtainable from Goldschmidt Chemical, Hopewell, Va., QMS435, available from Gelest, Inc., Tullytown, Pa., and poly(dimethylsiloxane-co-methyl (3-hydroxypropyl)siloxane-graft-poly(ethylene glycol)(3-(trimethylammonio)propyl chloride)ether), available from Aldrich Chemical Co., Milwaukee, Wis.

A similar process can be carried out with cationic-substituted polysiloxanes and lightfastness agents having carboxylic acid functional groups thereon, such as hydroxybenzoic acids and alkoxybenzoic acids, These carboxylic acids can be obtained from a number of commercial sources. Specifically, salicylic acid, 3-hydroxybenzoic acid, 2,3-dimethoxybenzoic acid, 2,4-dimethoxybenzoic acid, 2,5-dimethoxybenzoic acid, 2,6-dimethoxybenzoic acid, 3,4-dimethoxybenzoic acid, and 3,5-dimethoxybenzoic acid are available from Aldrich Chemical Co., Milwaukee, Wis. 3-(2H-Benzotriazol-2yl)-4-hydroxyphenylpropionic acid can be synthesized as follows:

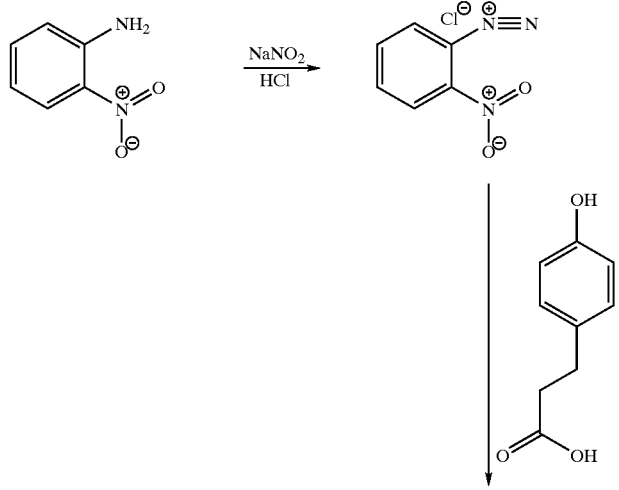

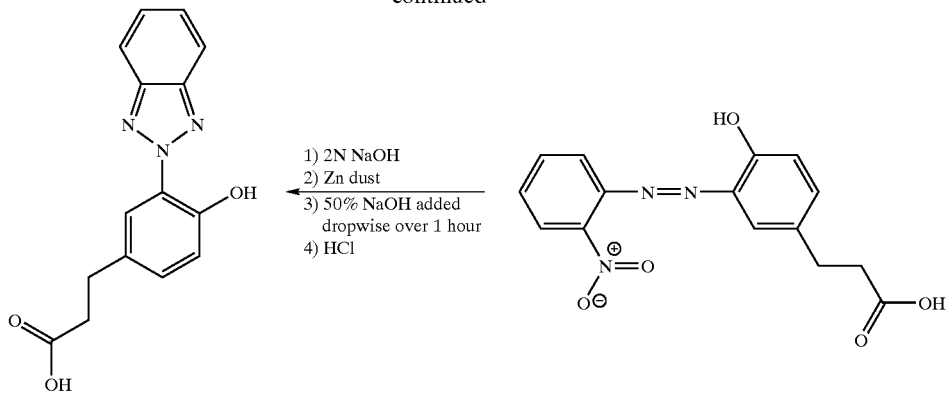

Inks of the present invention contain an aqueous liquid vehicle, a colorant, and a lightfastness agent. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60, The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No, 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A, Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Proclon Red $H_8B$ (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF), Savinyl Blue GLS (Sandoz); Luxol Blue MBSN (Morton-Thiokol), Basacid Blue 750 (BASF); Bernacid Red, available from Berncolors, Poughkeepsie, N.Y., Pontamine Brilliant Bond Blue; Berncolor A.Y. 34; Telon Fast Yellow 4GL-175; BASF Basacid Black SE 0228; the PRO-JET® series of dyes available from ICI, including PRO-JET® Yellow I (Direct Yellow 86), PRO-JET® Magenta I (Acid Red 249), PRO-JET® Cyan I (Direct Blue 199), PRO-JET® Black I (Direct Black 168), PRO-JET® Yellow 1-G (Direct Yellow 132), Aminyl Brilliant Red F-B, available from Sumitomo Chemical Company (Japan), the DUASYN® line of "salt-free" dyes available from Clariant Corp., Charlotte, N.C., such as DUASYN® Direct Black HEF-SF (Direct Black 168), DUASYN® Black RL-SF (Reactive Black 31), DUASYN® Direct Yellow 6G-SF VP216 (Direct Yellow 157), DUASYN® Brilliant Yellow GL-SF VP220 (Reactive Yellow 37), DUASYN® Acid Yellow XX-SF LP413 (Acid Yellow 23), DUASYNO Brilliant Red F3B-SF VP218 (Reactive Red 180), DUASYN® Rhodamine B-SF VP353 (Acid Red 52), DUASYN® Direct Turquoise Blue FRL-SF VP368 (Direct Blue 199), DUASYN® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy), Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy): Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include RAVEN® 5250, RAVEN® 5750, RAVEN® 3500 and other similar carbon black products available from Columbia Company, REGAL® 330, BLACK PEARL® L, BLACK PEARL® 1300, and other similar carbon black products available from Cabot Company, commercial carbon black dispersions such as CABOJET® 200, CABOJET® 300 (surface modified pigment), CABOJET® IJX 157, CABOJET® IJX 164, and the like, available from Cabot Chemical Co., the BONJET® pigment dispersions from Orient Chemical Company of Japan, Degussa carbon blacks such as COLOR BLACK® series, SPECIAL BLACK® series, PRINTTEX® series and DERUSSOL® carbon black dispersions available from Degussa Company, HOSTAFINE® series such as HOSTAFINE® Yellow GR (Pigment 13), HOSTAFINE® Yellow (Pigment 83), HOSTAFINE® Red FRLL (Pigment Red 9), HOSTAFINE® Rubine F6B (Pigment 184), HOSTAFINE® Blue 2G (Pigment Blue 15:3), HOSTAFINE® Black T (Pigment Black 7), and HOSTAFINE® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange Oreg. 2673 (Paul Uhlich), Paliogen Yellow 152, 1560 (BASF), Lithol Fast Yellow 0991 K (BASF), Paliotol Yellow 1840 (BASF), Novoperm Yellow F61 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

The compound of the formula

I

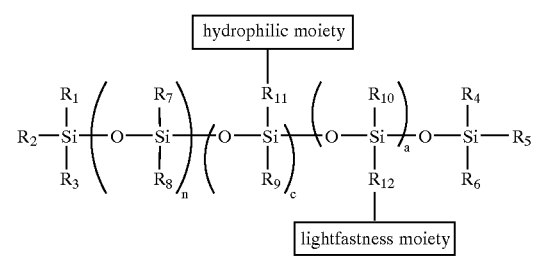

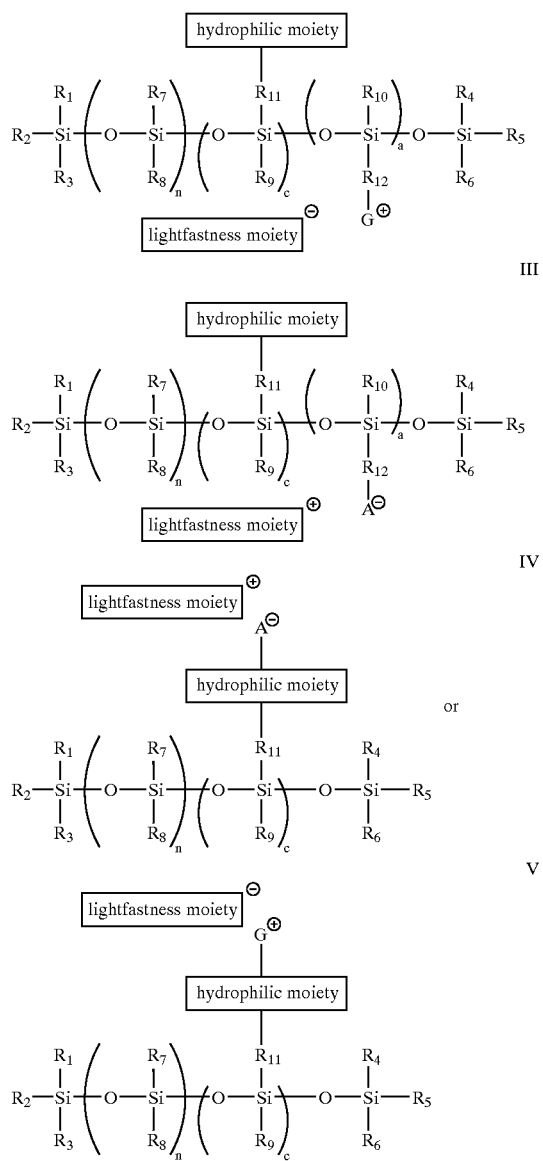

is present in the ink in any desired or effective amount, typically at least about 0.25 percent by weight of the ink, preferably at least about 0.5 percent by weight of the ink, and more preferably at least about 1 percent by weight of the ink, and typically no more than about 10 percent by weight of the ink, preferably no more than about 5 percent by weight of the ink, and more preferably no more than about 3 percent by weight of the ink, although the amount can be outside of these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions according to the present invention are generally of a viscosity suitable for use in said ink jet printing processes. For example, for thermal ink jet printing applications, at room temperature (i.e., about 25° C.), typically, the ink viscosity is typically at least about 1 centipoise and typically is no more than about 10 centipoise, preferably no more than about 7 centipoise, and more preferably no more than about 5 centipoise, although the viscosity can be outside of these ranges, particularly when the ink is used for applications such as acoustic ink jet printing. When used in marking pen applications, the ink compositions are generally of a viscosity suitable for use in said applications.

The ink compositions can be of any suitable or desired pH. For some embodiments, such as thermal ink jet printing processes, typical pH values are at least about 2, preferably at least about 3, and more preferably at least about 5, and typically up to about 11, preferably up to about 10, and more preferably up to about 9, although the pH can be outside of these ranges.

The ink compositions can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The ink compositions of the present invention can be used in a process which entails incorporating the ink composition into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of the Trimethylsilyl Ester of Propenoic Acid

The trimethylsilyl ester of propenoic acid was prepared by reaction of propenoic acid and hexamethyldisilazane. Thus, 13.3 grams (0.133 mole) of propenoic acid (obtained from Aldrich Chemical Co., Milwaukee, Wis.) was charged to a 100 milliliter round bottomed flask fitted with a condenser, argon purge, rubber serum cap, and magnetic stirring bar. After purging for about 15 minutes, 11.8 grams (0.73 mole) of hexamethyldisilazane (obtained from Aldrich Chemical Co.) was added through the serum cap via syringe. The reaction mixture exothermed, and vigorous outgassing was observed for 15 to 20 minutes. A drop of concentrated sulfuric acid was then added and the reaction mixture was refluxed for 2 hours to drive the reaction to completion. The flask was then fitted with a vacuum-jacketed Vigreux column, distillation head, and condenser with fraction cutter. The product was isolated by distillation and was used in Example II.

EXAMPLE II

Preparation of Poly(dimethylsiloxane-co-methyl (Carboxypentanoyl) siloxane)-graft-methoxypolyethylene Glycol Poly(dimethylsiloxane-co-methyl (carboxyltrimethylsilylpentanoyl)siloxane)-graft-methoxypolyethylene glycol was prepared by hydrosilylation of a mixture of the trimethylsilylester of propenoic acid (prepared in Example I) and methoxy polyethylene glycol monoallyl ether (Bimax Chemical, Cockeysville Md.) catalyzed by platinum divinyltetramethyl disiloxane complex (SIP 6831.0, obtained from Gelest, Inc., Tullytown Pa.). Thus, 19.8 grams (0.05 equivalents) of poly (dimethylsiloxane-co-methyl hydrogen siloxane) containing 15 to 18 mole percent (MeHSiO) (HMS 151, obtained from Gelest, Inc., Tullytown, Pa.), 3.5 grams (0.035 equivalents) of trimethylsilyl pentenoic acid (0.020 equivalents) of methoxy polyethylene glycol monoallyl ether, and 28 grams of methylene chloride were charged to a 50 milliliter bottle equipped with a magnetic stirring bar. The solution was purged with argon for 15 minutes prior to the introduction of 4 drops of SIP 6831.0. The reaction was allowed to proceed for 4 days at ambient temperature. At this time the reaction was judged to be complete on the basis of the disappearance of the characteristic Si—H infrared band at 2160–2180 cm$^{-1}$. Water was then added to the reaction mixture, and hydrolysis was effected by heating the mixture on a steam cone. The water and methylene chloride were then removed in vacuo. Methylene chloride was added and the resulting solution was passed through a column filled with neutral alumina to remove spent Pt catalyst. Removal of methylene chloride in vacuo yielded the desired product.

EXAMPLE III

Preparation of Poly(dimethylsiloxane-co-methyl(3-propyl(2-hydroxybenzophenone)siloxane)-graft-methoxypolyethylene Glycol)

Poly(dimethylsiloxane-co-methyl(3-propyl(2-hydroxybenzophenone)siloxane)-graft-methoxypolyethylene glycol) was prepared by hydrosilylation of a mixture of allyloxyhydroxybenzophenone and methoxy polyethylene glycol monoallyl ether catalyzed by platinum divinyltetramethyl disiloxane complex (SIP 6831.0, obtained from Gelest, Inc., Tullytown Pa.). Thus, 19.8 grams (0.05 equivalents) of poly(dimethylsiloxane-co-methyl hydrogen siloxane) containing 15 to 18 mole percent (MeHSiO) (HMS 151, obtained from Gelest, Inc., Tullytown, Pa.), 0.035 equivalents of allyloxyhydroxybenzophenone, 0.020 equivalents of methoxy polyethylene glycol monoallyl ether, and 28 grams of methylene chloride were charged to a 50 milliliter bottle equipped with a magnetic stirring bar. The solution was purged with argon for 15 minutes prior to the introduction of 4 drops of SIP 6831.0, The reaction was allowed to proceed for 4 days at ambient temperature. At this time the reaction was judged to be complete on the basis of the disappearance of the characteristic Si—H infrared band at 2160–2180 cm$^{-1}$. Additional methylene chloride was added and the resulting solution was passed through a column filled with neutra alumina to remove spent Pt catalyst. Removal of methylene chloride in vacuo yielded the desired product.

EXAMPLE IV

Preparation of Poly(dimethylsiloxane-co-methyl(3-propyl(2-hydroxybenzotriazole)siloxane)-graft-methoxypolyethylene Glycol)

Poly(dimethylsiloxane-co-methyl(2-(3-2H-benzotriazol-2-yl)-4-hydroxyphenyl)ethylpentanoate)siloxane)-graft-methoxypolyethylene glycol) was prepared by a procedure analogous to that of Example III except that the allyloxy-hydroxybenzophenone was substituted with 2-(3-2H-benzotriazol-2-yl-4-hydroxyphenyl) ethylpentenoate. 2-(3-2H-benzotriazol-2-yl-4-hydroxyphenyl) ethylpentenoate was synthesized by esterification of 2-(3-2H-benzotriazol-2-yl-4-hydroxyphenethyl alcohol (Aldrich 43,071-4) with pentenoic acid (Aldrich 24,592-5) or pentenoic anhydride (Aldrich 47,180-1).

EXAMPLE V

Preparation of Quaternary Ammonium Hydroxybenzotriazole Salt of Poly (dimethylsiloxane-co-methyl (carboxypentanoyl) siloxane)-graft-methoxypolyethylene Glycol)

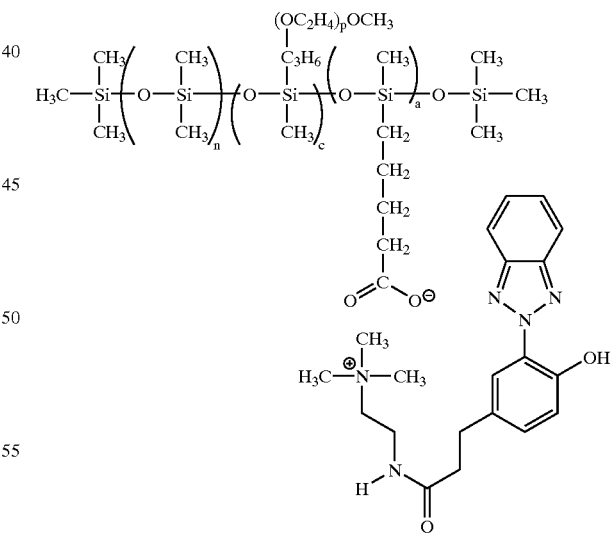

The above complex with a cationic lightfastness agent is prepared by ion exchange. Ion exchange is accomplished by mixing of an acetone solution containing the cationic lightfastness agent in acetone with an acetone solution containing the anionic hydrophilic polysiloxane prepared in Example II. NaCl is removed by filtration and the product is obtained by removal of acetone in vacuo.

EXAMPLE VI

Synthesis of the 2-hydroxy-4-methoxybenzophenone-5-sulfonate salt of QMS 435.

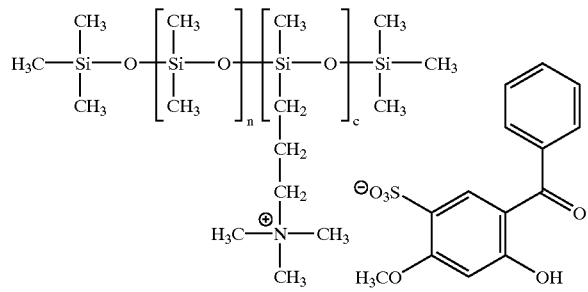

The 2-hydroxy-4-methoxybenzophenone-5-sulfonate salt of QMS 435 (poly(dimethylsiloxane-co-methyl(3-trimethylaminopropyl) siloxane)) is prepared by ion exchange. Ion exchange is accomplished by mixing of an acetone solution containing the anionic lightfastness agent sodium 2-hydroxy-4-methoxybenzophenone-5-sulfonate in acetone with an acetone solution containing the cationic polysiloxane QMS435 (available from Gelest, Inc., Tullytown, Pa.). NaCl is removed by filtration and the product is obtained by removal of acetone in vacuo.

EXAMPLE VII

A magenta ink composition was prepared by simple mixing of the following ingredients:

| Ingredient | Supplier | Amount (grams) |
|---|---|---|
| sulfolane* | Phillips 66 | 15 |
| bulyl carbitol | Van Waters & Rogers | 12 |
| acetylethanolamine** | Scher Chemical | 15 |
| PROJET ® RED OAM dye*** | Zeneca | 5 |
| PROJET ® MAGENTA 3BOA**** | Zeneca | 25 |
| poly(dimethylsiloxane-co-methyl(3-propyl(2-hydroxybenzophenone)siloxane)-graft-methoxypolyethylene glycol) | Example III | 1 |
| deionized water | — | 25.8 |
| DOWICIL ® 150/200 biocide | Dow Chemical Co. | 0.1 |
| EDTA | Dow Chemical Co. | 0.065 |
| Imidazole | BASF | 1 |
| CRISANOL ® E2000 polyethylene oxide | Clariant Chemical | 0.05 |

*95 wt. % sulfolane, 5 wt. % water
**75 wt. % acetylethanolamine, 25 wt. % water
***containing 8.5 wt. % Acid Red 52 dye solids in water
****containing 10 wt. % dye solids in water For comparative purposes, an identical ink was made except that it contained no poly(dimethylsiloxane-co-methyl(3-propyl(2-hydroxybenzophenone)siloxane)-graft-methoxypolyethylene glycol) and contained 26.8 grams deionized water.

EXAMPLE VIII

Lightfastness of the two inks prepared in Example VII is evaluated as follows. Differences in solid area optical density are measured with an optical densitometer (X-RITE Model 428) and are evaluated for solid area test patterns (1.25 inch solid squares) printed with a XEROX® M-750 ink jet printer on XEROX® Hi-Tech Ink Jet paper and FOLEX® photo paper. Samples for exposure are cut from the test print area, mounted, and exposed for 48 hours in an ATLAS Model 25 FR Xenon Fadeometer equipped with a 2500 watt lamp, a borosilicate glass inner filter (275 nm cutoff), and a soda lime glass outer filter (320 nm cutoff). This combination of light filters closely approximates sunlight passing through window glass. The prints are aged in the dark for 24 hours before making lightfastness measurements. Irradiance is 0.75 Watts per square meter and total irradiation is 129.6 kilojoules per square meter. Black Panel Temperature is about 63° C. Nominal Relative Humidity is 35 percent.

It is believed that the lightfastness characteristics of the inks containing poly(dimethylsiloxane-co-methyl(3-propyl(2-hydroxybenzophenone)siloxane)-graft-methoxypolyethylene glycol) will be improved compared to those of the control ink. After 48 hours of exposure in the ATLAS Model 25 FR Xenon Fadeometer, it is believed that the solid area images printed with the control ink will suffer a 90 percent reduction in optical density. It is also believed that solid area images printed with the poly(dimethylsiloxane-co-methyl(3-propyl(2-hydroxybenzophenone)siloxane)-graft-methoxypolyethylene glycol)-containing inks and exposed in the same test will suffer a reduction in optical density of less than 50 percent.

EXAMPLE IX

Three additional ink compositions are prepared as described in Example VII except that the lightfastness agents used are those prepared in Examples IV, V, and VI respectively. The lightfastness of these inks is tested as described in Example VIII. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An ink composition which comprises water, a colorant, and a lightfastness agent of one of the formulae

I

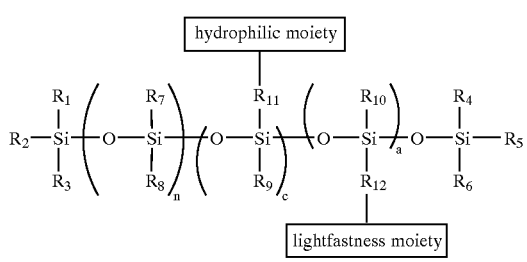

-continued

II

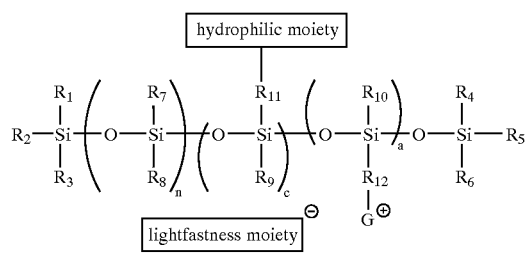

III

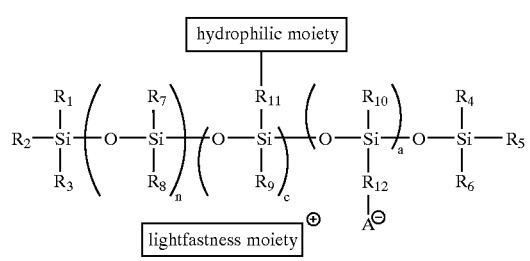

or

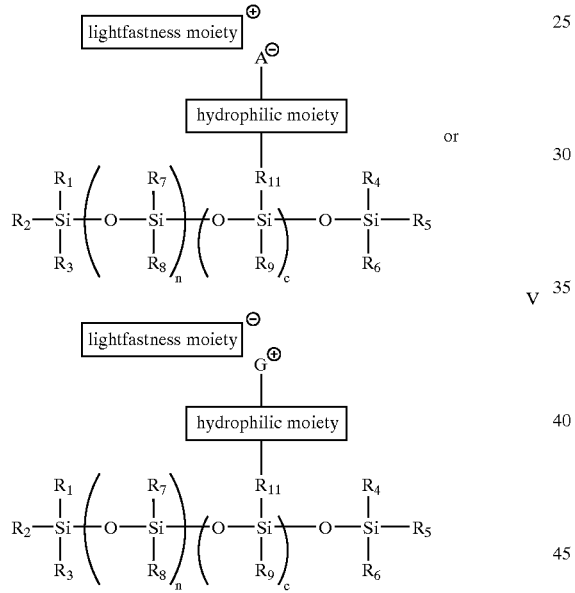

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)-monomer units, a is an integer representing the number of repeat —OSi($R_{10}$)($R_{12}$-lightfastness moiety)-monomer units, and c is an integer representing the number of repeat —OSi($R_9$) ($R_{11}$-hydrophilic moiety)-monomer units.

2. An ink according to claim 1 wherein the lightfastness agent is of Formula I and the lightfastness moiety is a 2-(3-(2H-benzotriazol-2-yl)-4-hydroxyphenyl) group, a hydroxybenzophenone group, a hydroxybenzoic acid group, an alkoxybenzoic acid group, an ester of a substituted benzoic acid, a (hydroxyphenyl)-1,3,5-triazine group, a phenylbenzimidazole sulfonic acid group, or a reducing sugar group.

3. An ink according to claim 1 wherein the lightfastness agent is of Formula I and the lightfastness moiety is of one of the formulae

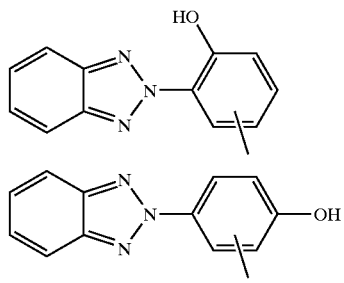

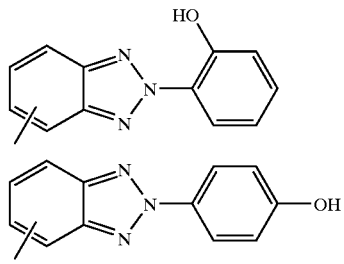

IV

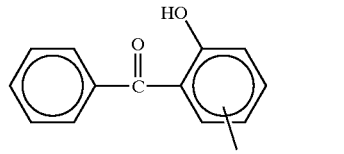

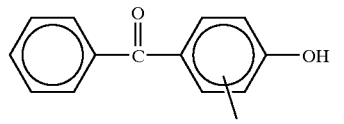

V

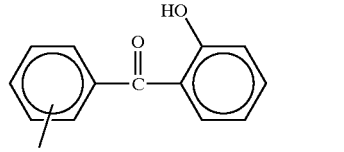

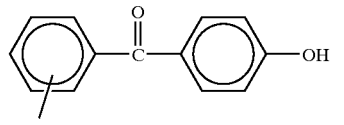

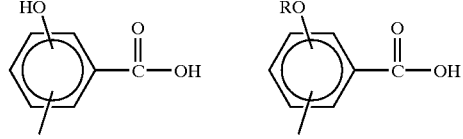

wherein R is an alkyl group, an aryl group, an arylalkyl group, or an alkylaryl group,

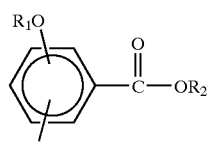

wherein $R_1$ and $R_2$ each, independently of the other, is an alkyl group, an aryl group, an arylalkyl group, or an alkylaryl group,

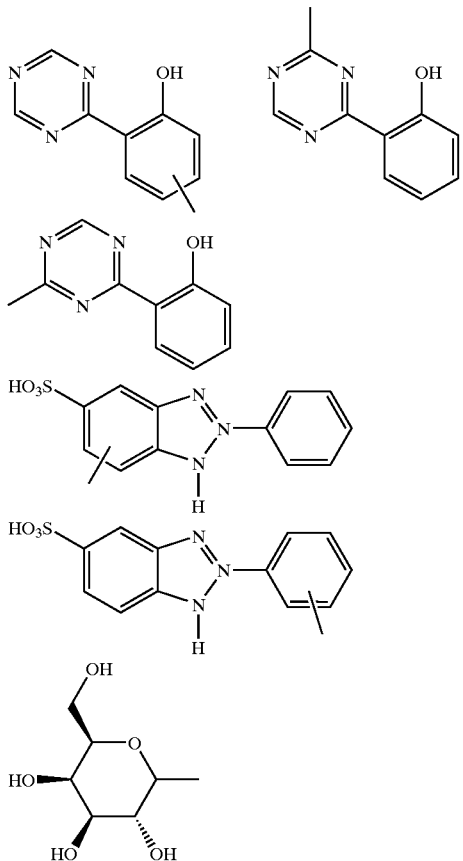

4. An ink according to claim 1 wherein the hydrophilic moiety is a polyoxyalkylene chain, a poly(2-alkyloxazoline), or a poly(ethyleneimine) chain.

5. An ink according to claim 1 wherein the hydrophilic moiety is a polyethylene oxide chain, a polypropylene oxide chain, a polybutylene oxide chain, or a copolymer of two or more of ethylene oxide, propylene oxide, and butylene oxide.

6. An ink according to claim 1 wherein the hydrophilic moiety is (a) of one of the formulae

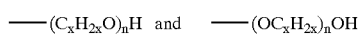

wherein x, independently in each single repeat alkylene oxide unit, is an integer of 2, 3, or 4 and n is an integer representing the number of repeat alkylene oxide units, (b) of the formula

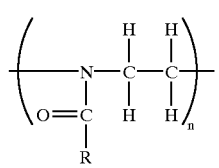

wherein R is an alkyl group, an aryl group, an arylalkyl group, or an alkylaryl group, and n is an integer representing the number of repeat monomer units, or (c) of the formula

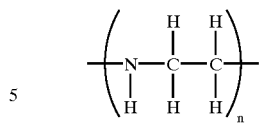

wherein n is an integer representing the number of repeat monomer units.

7. An ink according to claim 1 wherein the lightfastness agent is present in the ink in an amount of at least about 0.25 percent by weight of the ink, and wherein the lightfastness agent is present in the ink in an amount of no more than about 10 percent by weight of the ink.

8. An ink composition which comprises water, a colorant, and a lightfastness agent of the formula

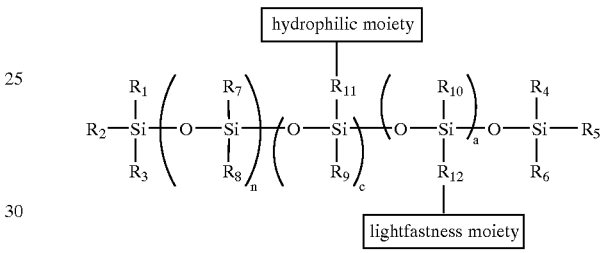

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$, and $R_{12}$ each, independently of the others, is an alkylene group, an arylene group, an arylalkylene group, or an alkylarylene group, n is an integer representing the number of repeat —OSi($R_7$)($R_8$)- monomer units, a is an integer representing the number of repeat —OSi($R_{10}$)($R_{12}$-lightfastness moiety)-monomer units, and c is an integer representing the number of repeat —OSi($R_9$)($R_{11}$-hydrophilic moiety)-monomer units, wherein the lightfastness moiety is of one of the formulae

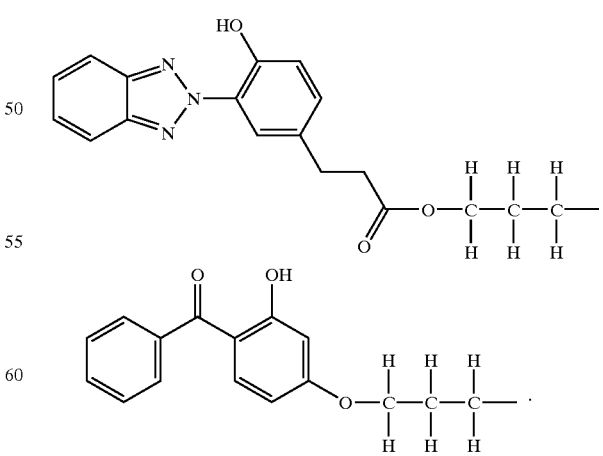

9. An ink composition which comprises water, a colorant, and a lightfastness agent of one of the formulae

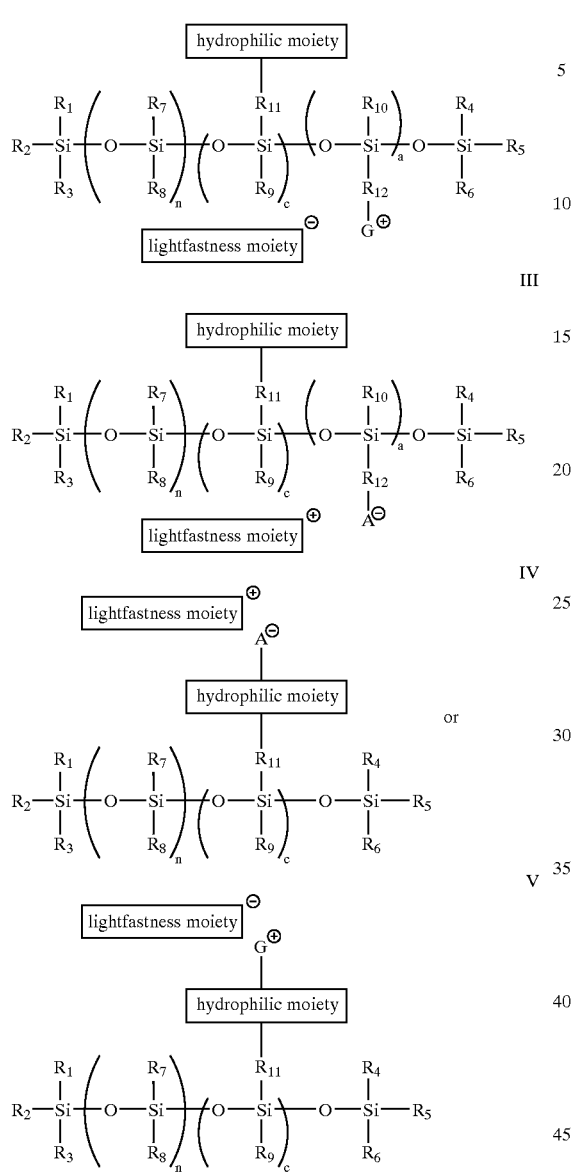

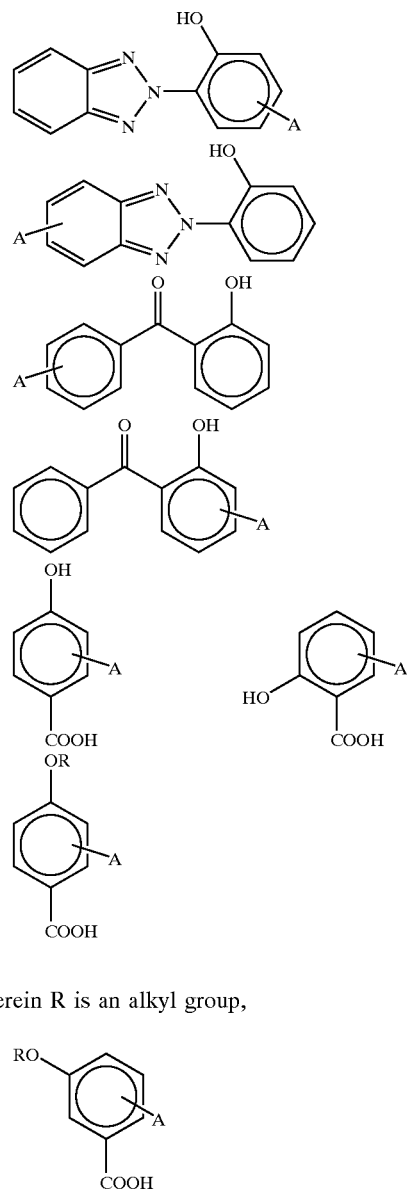

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)-monomer units, a is an integer representing the number of repeat —OSi($R_{10}$)($R_{12}$-lightfastness moiety)-monomer units, and c is an integer representing the number of repeat —OSi($R_9$)($R_{11}$-hydrophilic moiety)-monomer units.

10. An ink according to claim 9 wherein the lightfastness agent is of Formula II or Formula V and the lightfastness moiety is an anionic (hydroxyphenyl)benzotriazole, an anionic hydroxybenzophenone, an anionic hydroxybenzoic acid, an anionic alkoxybenzoic acid, an anionic ester of a substituted benzoic acid, or an anionic (hydroxyphenyl)-1,3,5 triazine.

11. An ink according to claim 9 wherein the lightfastness agent is of Formula II or Formula V and the lightfastness moiety is of one of the formulae wherein R is an alkyl group,

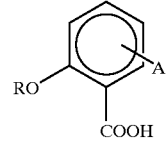

wherein R is an alkyl group, wherein R is an alkyl group,

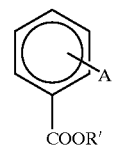

wherein R is an alkyl group,

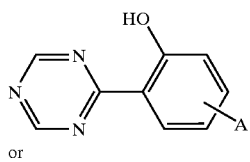

or

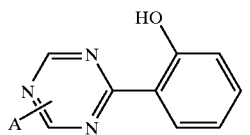

wherein A is an anionic substituent.

12. An ink composition according to claim 11 wherein A is a carboxylate group, a moiety substituted with a carboxylate group, a sulfonate group, a moiety substituted with a sulfonate group, a phosphonate group, or a moiety substituted with a phosphonate group.

13. An ink according to claim 9 wherein the lightfastness agent is of Formula II or Formula V and the lightfastness moiety is of one of the formulae

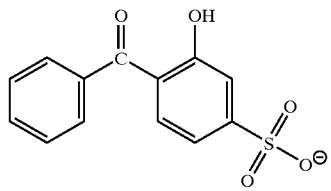

or

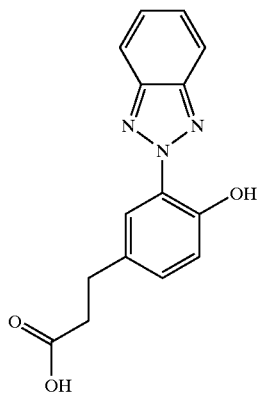

14. An ink according to claim 9 wherein the lightfastness agent is of Formula II or Formula V and the lightfastness moiety is 2-hydroxy-4-methoxybenzophenone-5-sulfonic acid; 2,2'-dihydroxy-4,4'dimethoxybenzophenone-5-sulfonic acid; 2,3-dimethoxybenzoic acid; 3,4-dimethoxybenzoic acid; 3,5-dimethoxybenzoic acid; 2,5-dimethoxybenzoic acid; 2,6-dimethoxybenzoic acid 3,4-dimethoxybenzenesulfonic acid; 3,4,5-trimethoxybenzoic acid; 2,4,5-trimethoxybenzoic acid; 4,5-dimethoxyphthalic acid; 2,3-bis-isopropylidenedioxybenzoic acid; 2,3-bis-(carboxymethyloxy)-benzoic acid; 2,5-dihydroxyphenylacetic acid; or mixtures thereof.

15. An ink according to claim 9 wherein the lightfastness agent is of Formula II or Formula V and the lightfastness moiety is of one of the formulae

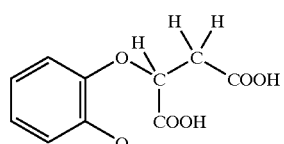

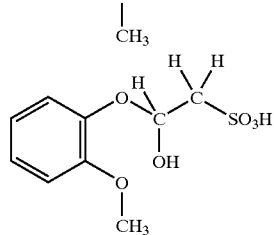

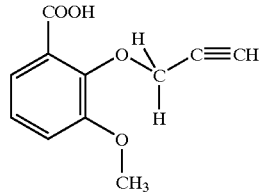

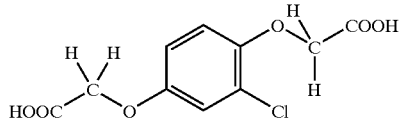

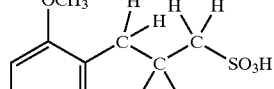

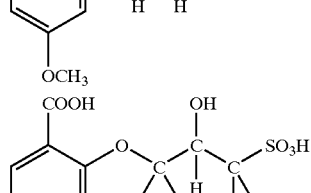

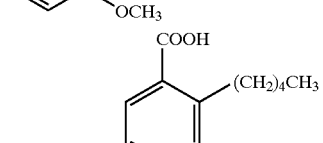

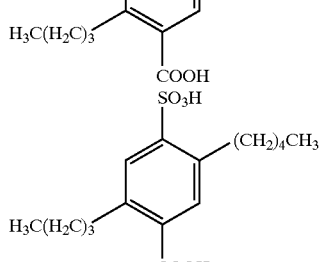

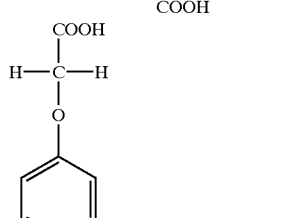

-continued

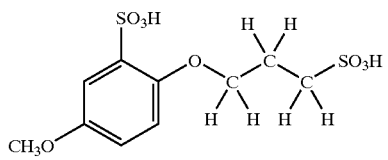
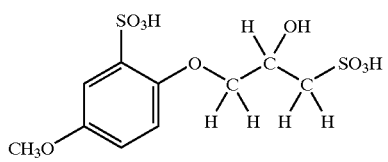
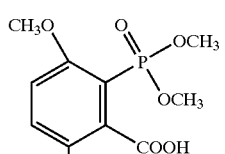
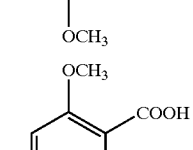
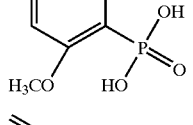
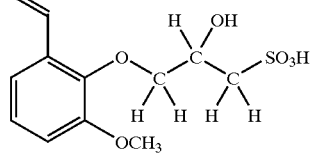
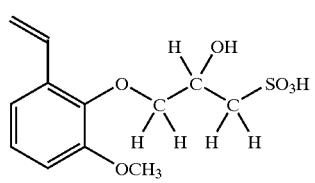
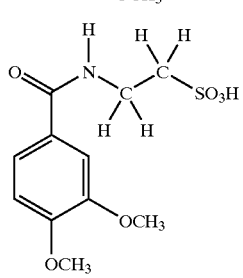

or

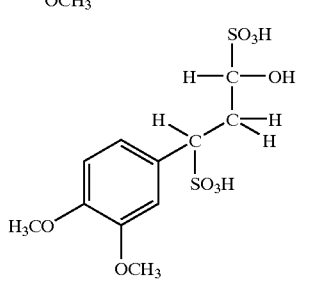

-continued

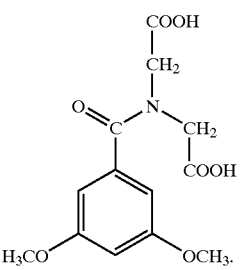

16. An ink according to claim 9 wherein the lightfastness agent is of Formula III or Formula IV and the lightfastness moiety is a 2-(3-(2H-benzotriazol-2-yl)-4-hydroxyphenyl) quaternary compound, a hydroxybenzophenone quaternary compound, or a quaternary ammonium derivative of a dialkylaminobenzoate.

17. An ink according to claim 9 wherein the lightfastness agent is of Formula III or Formula IV and the lightfastness moiety is of one of the formulae

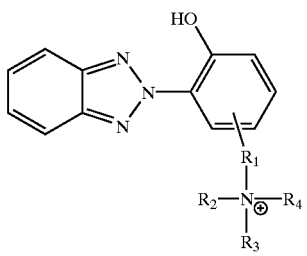
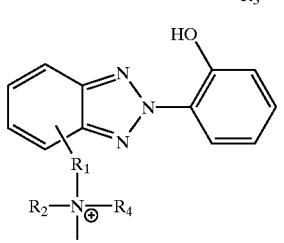
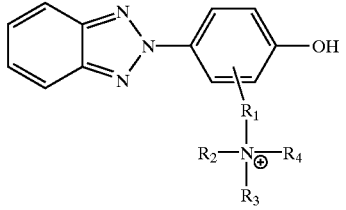
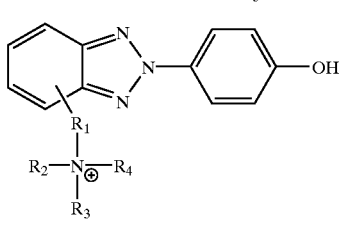

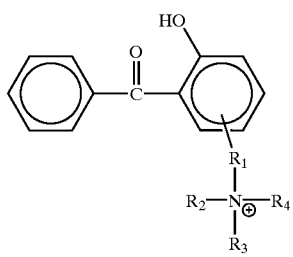

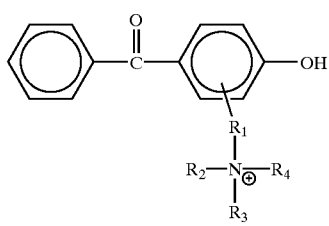

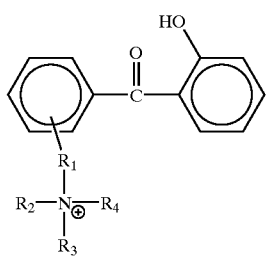

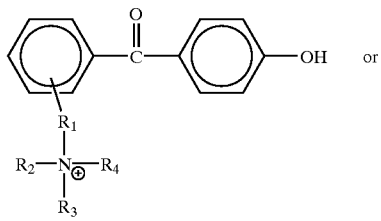

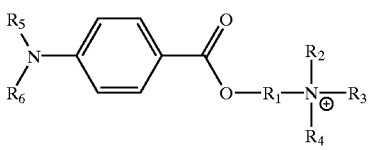 or wherein $R_5$ and $R_6$ each, independently of the other, is an alkyl group or an arylalkyl group, $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

18. An ink according to claim 9 wherein the lightfastness agent is of Formula III or Formula IV and the lightfastness moiety is of one of the formulae

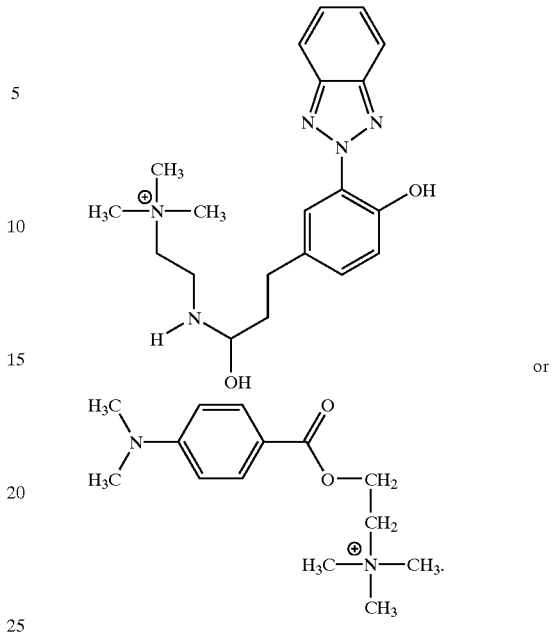 or

19. An ink according to claim 9 wherein the lightfastness agent is poly(dimethylsiloxane-co-methyl (carboxyltrimethylsilylpentanoyl)siloxane)-graft-methoxypolyethylene glycol, poly(dimethylsiloxane-co-methyl(3-propyl(2-hydroxybenzophenone)siloxane)-graft-methoxypolyethylene glycol), Poly(dimethylsiloxane-co-methyl(2-(3-2H-benzotriazol-2-yl)-4-hydroxyphenyl) ethylpentanoate)siloxane)-graft-methoxypolyethylene glycol), the quaternary ammonium hydroxybenzotriazole salt of poly(dimethylsiloxane-co-methyl (carboxypentanoyl) siloxane)-graft-methoxypolyethylene glycol), the 2-hydroxy-4-methoxybenzophenone-5-sulfonate salt of poly(dimethylsiloxane-co-methyl(3-trimethylaminopropyl)siloxane), or a mixture thereof.

20. An ink according to claim 9 wherein the hydrophilic moiety is a polyoxyalkylene chain, a poly(2-alkyloxazoline), or a poly(ethyleneimine) chain.

21. An ink according to claim 9 wherein the hydrophilic moiety is a polyethylene oxide chain, a polypropylene oxide chain, a polybutylene oxide chain, or a copolymer of two or more of ethylene oxide, propylene oxide, and butylene oxide.

22. An ink according to claim 9 wherein the hydrophilic moiety is (a) of one of the formulae

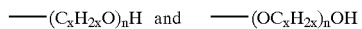

wherein x, independently in each single repeat alkylene oxide unit, is an integer of 2, 3, or 4 and n is an integer representing the number of repeat alkylene oxide units, (b) of the formula

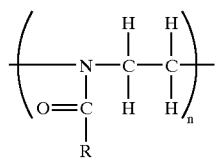

wherein R is an alkyl group, an aryl group, an arylalkyl group, or an alkylaryl group, and n is an integer representing the number of repeat monomer units, or (c) of the formula

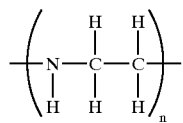

wherein n is an integer representing the number of repeat monomer units.

23. An ink according to claim 9 wherein the lightfastness agent is present in the ink in an amount of at least about 0.25 percent by weight of the ink, and wherein the lightfastness agent is present in the ink in an amount of no more than about 10 percent by weight of the ink.

24. A process which comprises (a) incorporating into an ink jet printing apparatus an ink composition according to claim and (b) causing droplets of the inks to be ejected in an imagewise pattern onto a recording substrate.

25. A process according to claim 24 wherein the printing apparatus employs a thermal ink jet process wherein the ink in the nozzles is selectively heated in an imagewise pattern, thereby causing droplets of the ink to be ejected in imagewise pattern.

26. A process according to claim 24 wherein the printing apparatus employs a piezoelectric ink jet process wherein droplets of the ink are caused to be ejected in imagewise pattern by oscillations of piezoelectric vibrating elements.

27. A process which comprises (a) incorporating into an ink jet printing apparatus an ink composition comprising water, a colorant, and a lightfastness agent of one of the formulae

I

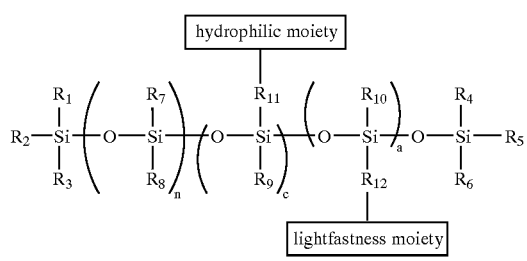

-continued

II

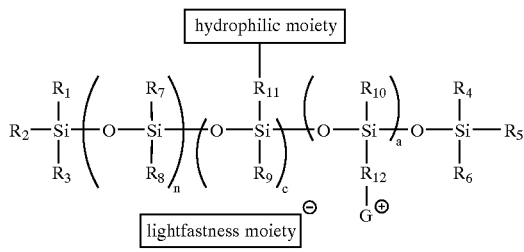

III

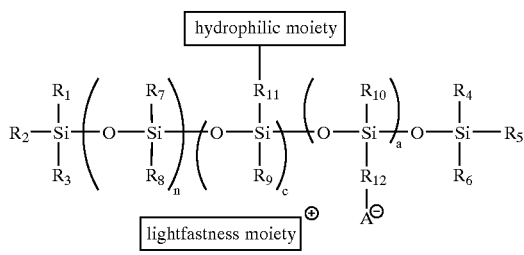

IV

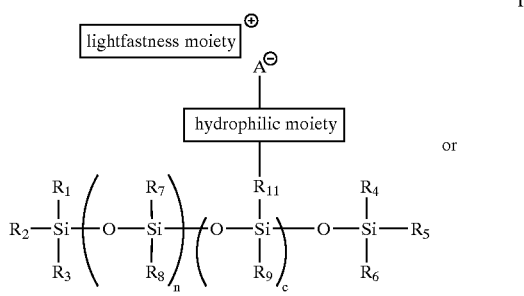

or

V

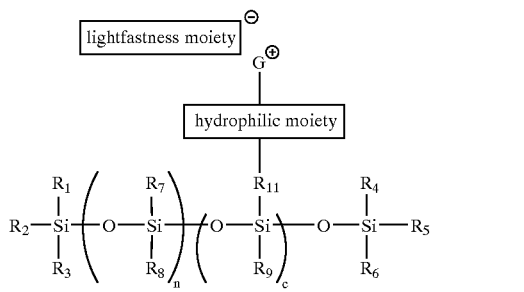

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$, and $R_{12}$ each, independently of the others, is an alkylene group, an arylene group, an arylalkylene group, or an alkylarylene group, G is a cationic moiety, A is an anionic moiety, n is an integer representing the number of repeat —OSi($R_7$)($R_8$)-monomer units, a is an integer representing the number of repeat —OSi($R_{10}$)($R_{12}$-lightfastness moiety)-monomer units, and c is an integer representing the number of repeat —OSi($R_9$) ($R_{11}$-hydrophilic moiety)-monomer units, and (b) causing droplets of the inks to be ejected in an imagewise pattern onto a recording substrate.

28. A process according to claim 27 wherein the printing apparatus employs a thermal ink jet process wherein the ink in the nozzles is selectively heated in an imagewise pattern, thereby causing droplets of the ink to be ejected in imagewise pattern.

29. A process according to claim 27 wherein the printing apparatus employs a piezoelectric ink jet process wherein droplets of the ink are caused to be ejected in imagewise pattern by oscillations of piezoelectric vibrating elements.

30. An ink composition which comprises water, a colorant, and a lightfastness agent of one of the formula

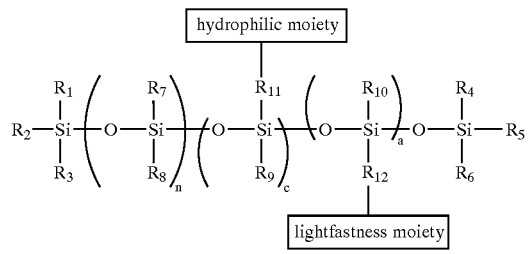

I wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$, and $R_{12}$ each, independently of the others, is an alkylene group, an arylene group, an arylalkylene group, or an alkylarylene group, n is an integer representing the number of repeat —OSi($R_7$)($R_8$)-monomer units, a is an integer representing the number of repeat —OSi($R_{10}$)($R_{12}$-lightfastness moiety)-monomer units, and c is an integer representing the number of repeat —OSi($R_9$)($R_{11}$-hydrophilic moiety)-monomer units, wherein the lightfastness moiety is a hydroxybenzophenone group, a hydroxybenzoic acid group, an alkoxybenzoic acid group, an ester of a substituted benzoic acid, a (hydroxyphenyl)-1,3,5-triazine group, a phenylbenzimidazole sulfonic acid group, or a reducing sugar group.

31. An ink according to claim 30 wherein the lightfastness moiety is of one of the formulae

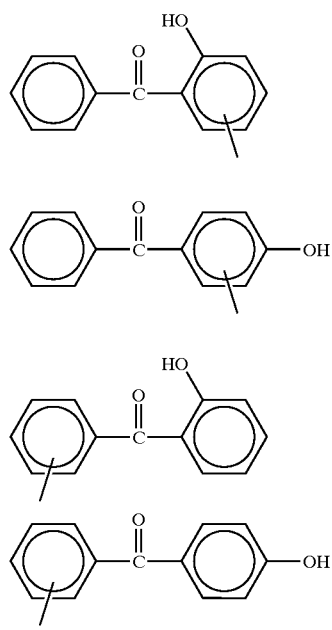

-continued

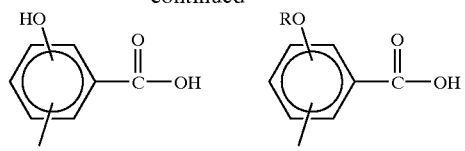

wherein R is an alkyl group, an aryl group, an arylalkyl group, or an alkylaryl group,

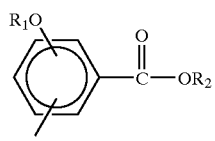

wherein $R_1$ and $R_2$ each, independently of the other, is an alkyl group, an aryl group, an arylalkyl group, or an alkylaryl group,

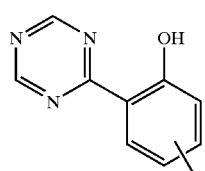

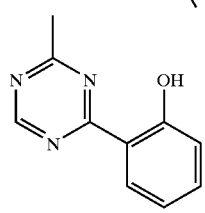

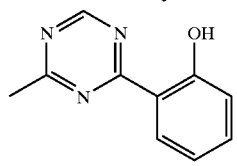

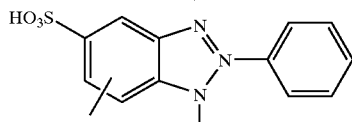

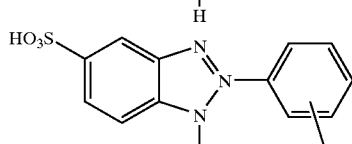

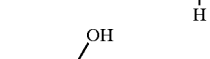

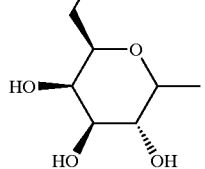

32. An ink composition which comprises water, a colorant, and a lightfastness agent of one of the formula

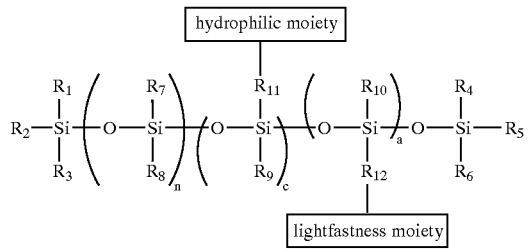

wherein $R_1$, $R_2$, $R_3$, $R_4$, $R_5$, $R_6$, $R_7$, $R_8$, $R_9$, and $R_{10}$ each, independently of the others, is an alkyl group, an aryl group, an arylalkyl group, or an alkylaryl group, $R_{11}$ and $R_{12}$ each, independently of the others, is an alkylene group, an arylene group, an arylalkylene group, or an alkylarylene group, n is an integer representing the number of repeat —OSi($R_7$)($R_8$)- monomer units, a is an integer representing the number of repeat —OSi($R_{10}$)($R_{12}$-lightfastness moiety)-monomer units, and c is an integer representing the number of repeat —OSi($R_9$)($R_{11}$-hydrophilic moiety)-monomer units, wherein the hydrophilic moiety is a poly(2-alkyloxazoline) or a poly(ethyleneimine) chain.

33. An ink according to claim 32 wherein the hydrophilic moiety is (a) of the formula

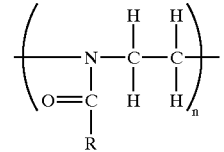

wherein R is on alkyl group, an aryl group, an arylalkyl group, or an alkylaryl group, and n is an integer representing the number of repeat monomer units, or (b) of the formula

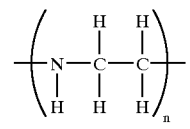

wherein n is on integer representing the number of repeat monomer units.

* * * * *